US007894101B2

(12) United States Patent
Ichinose et al.

(10) Patent No.: US 7,894,101 B2
(45) Date of Patent: Feb. 22, 2011

(54) COLOR IMAGE FORMING APPARATUS AND METHOD OF CONTROLLING THE SAME

(75) Inventors: Kimitaka Ichinose, Suntou-gun (JP); Yoshimichi Ikeda, Numazu (JP); Tomoaki Nakai, Numazu (JP); Tatsuya Kinukawa, Mishima (JP); Hiroyuki Seki, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 328 days.

(21) Appl. No.: 12/276,194

(22) Filed: Nov. 21, 2008

(65) Prior Publication Data

US 2009/0141296 A1 Jun. 4, 2009

(30) Foreign Application Priority Data

Nov. 30, 2007 (JP) ............................ 2007-309703

(51) Int. Cl.
*H04N 1/60* (2006.01)

(52) U.S. Cl. ....................... 358/1.9; 358/501; 358/504; 399/39; 399/301; 347/116

(58) Field of Classification Search .................. 358/1.9, 358/601, 604, 518; 399/39, 45, 46, 111, 399/301; 347/116

See application file for complete search history.

(56) References Cited

U.S. PATENT DOCUMENTS

| | | | | |
|---|---|---|---|---|
| 6,246,844 | B1 | 6/2001 | Shiba | |
| 7,313,352 | B2 * | 12/2007 | Shinohara et al. | 399/301 |
| 7,715,770 | B2 * | 5/2010 | Kinoshita | 399/301 |
| 2005/0200689 | A1 * | 9/2005 | Shinohara et al. | 347/116 |
| 2008/0013972 | A1 * | 1/2008 | Matsuda | 399/45 |
| 2008/0181634 | A1 * | 7/2008 | Kinoshita | 399/39 |
| 2009/0175637 | A1 * | 7/2009 | Imamura et al. | 399/46 |

FOREIGN PATENT DOCUMENTS

| | | |
|---|---|---|
| JP | 2000-131900 A | 5/2000 |
| JP | 2002-229279 A | 8/2002 |

* cited by examiner

*Primary Examiner*—Kimberly A Williams
(74) *Attorney, Agent, or Firm*—Canon USA Inc IP Division

(57) ABSTRACT

A color image forming apparatus in which a positional displacement detection image and a light quantity adjustment image are formed within a one-rotation length of an image bearing member (intermediate transfer belt). A light-emission quantity when detecting density is determined on the basis of a detection result of a light quantity adjustment image formed within the one-rotation length using light-emission quantity that is provided when light is emitted to the positional displacement detection image. This allows, for example, image density control to be performed quickly while precision of the image density control is maintained.

10 Claims, 27 Drawing Sheets

| | IMAGE DENSITY CONTROL | COLOR MISREGISTRATION CORRECTION CONTROL | | LIGHT QUANTITY ADJUSTMENT WHEN DETECTING DENSITY |
|---|---|---|---|---|
| | | LOW-COST IMAGE BEARING MEMBER | HIGH-COST IMAGE BEARING MEMBER | |
| SPECULAR REFLECTED LIGHT | ○ | × | ○ | × |
| IRREGULARLY REFLECTED LIGHT (DIFFUSED REFLECTED LIGHT) | ○ | ○ | × | ○ |

○ SUITED
× NOT SUITED

COLOR IMAGE FORMING APPARATUS AND METHOD OF CONTROLLING THE SAME

BACKGROUND OF THE INVENTION

1. Field of the Invention

The present invention relates to a color image forming apparatus (such as a copying machine, a printer, or a facsimile (FAX)) using an electrophotography method.

2. Description of the Related Art

In recent years, a color image forming apparatus using an electrophotography method is widely used. Since the color image forming apparatus is required to provide precise color reproducibility and color stability, the color image forming apparatus is generally provided with a function for automatically executing image density control. In particular, due to variations in color caused by, for example, changes in the environment in which the color image forming apparatus is used and the history of use of various consumable items, it is necessary to periodically execute the image density control for stabilizing the color at all times.

In an example of the image density control, a plurality of test toner images (patches), formed on an image bearing member while changing an image-formation condition, are detected with an optical image density detector, disposed in the image forming apparatus. In this case, a detection result of the optical image density detector is converted to a toner adhesion amount, to set suitable image-formation conditions on the basis of a conversion result. Here, examples of image-formation conditions include dynamic conditions (such as charging voltage, exposure strength, and development voltage) and corrections (adjustments) of a conversion condition table used when forming a half tone image. Here, when the toner adhesion amount is not a toner amount (g), the toner adhesion amount may be any amount equivalent to the toner amount (g) that can be determined by a printer body.

Here, the operation of the optical image density detector will be described in more detail. First, basically, a patch or an image bearing member is irradiated with light by a light-emitting element, and light reflected from the patch or the image bearing member is received by a photodetector. On the basis of a result obtained when the light is received by the photodetector, the toner adhesion amount of the patch is calculated. Here, for stabilizing detection precision, it is important that the quantity of light emitted from the light-emitting element be set at a suitable value. When the light-emission quantity is too large, the quantity of light reflected from the patch or the image bearing member becomes too large. This causes an output of the photodetector to be fixed at an upper limit. As a result, the toner adhesion amount cannot be precisely calculated. On the other hand, when the light-emission quantity is too small, the quantity of light reflected from the patch or the image bearing member becomes too small. In addition, a change in output of the photodetector becomes small with respect to a change in the toner adhesion amount of the patch. When this is converted to the toner adhesion amount, an error becomes large. Further, the output of the photodetector changes with, for example, a change in reflectivity (caused by deterioration of the image bearing member (which is a detection surface) with time), staining of the image density detector with time, or a lot variation of structural components of the image density detector. From this viewpoint, it is important that the light-emission quantity be set at a suitable value.

On the basis of such a background, in general, sensor characteristics are corrected before detecting a toner adhesion amount (that is, before controlling image density). Practical forms are discussed in, for example, Japanese Patent Laid-Open Nos. 2002-229279 and 2000-13190. Here, the term "correction" refers to adjustment of a toner-adhesion-amount sensor output to a constant/substantially constant value by adjusting the light-emission quantity of a sensor light-emitting element (LED, etc).

In controlling the image density, in general, first, the light-emission quantity is adjusted. Then, after obtaining an output VB of the photodetector when there is no adhesion of toner, the image bearing member is rotated. Then, patches are formed to obtain an output VP of the photodetector. The quantity of light emitted from the light-emitting element is generally made equal to a light-emission quantity obtained on the basis of the outputs VB and VP because it takes time for an output of light to be stabilized. In addition, for adjusting light quantity, it is necessary to form a solid patch on the image bearing member. Further, the solid patch needs to be completely eliminate. This is because, if the output VB is obtained when the solid patch is not sufficiently eliminated, the toner amount cannot be precisely calculated. Here, the term "completely" means "sufficiently" in detecting the density, so that the solid patch is not actually eliminated completely.

According to the above-described background, ordinarily, as shown in FIG. 27, the image density is controlled after increasing the number of rotations of the image bearing member and removing toner.

However, as a consequence, in addition to formation/detection of a patch (indicated by reference numeral 2601 in FIG. 27), for example, cleaning of the intermediate transfer belt is performed many times due to removal of the solid patch. Therefore, processing time is increased.

Although it is known that there is a risk that the solid patch cannot be completely eliminated, reducing the number of rotations of the image bearing member and omitting the removal of the toner make it possible to reduce an image density controlling time. However, in this case, the precision with which the image density is controlled is reduced.

SUMMARY OF THE INVENTION

Embodiments of the present invention are provided to overcome the above-described drawbacks of the related technology.

According to an aspect of the present invention, there is provided a color image forming apparatus comprising an image forming unit that forms an image; an image bearing member that bears a toner image of a plurality of colors; an optical detecting unit including a light-emitting element that emits light and a photodetector that receives reflected light; a position detecting unit that determines a position of a positional displacement detection image on the basis of a detection result provided when the light is emitted onto the positional displacement detection image of the plurality of colors formed on the image bearing member; a density detecting unit that detects density on the basis of a detection result provided when the light is emitted onto a density detection image formed on the image bearing member; and a light-quantity adjusting unit that determines light-emission quantity when the density is detected with the density detecting unit on the basis of a detection result provided when the light is emitted onto a light-quantity adjustment image formed on the image bearing member. The image forming unit forms the positional displacement detection image and the light-quantity adjustment image within a one-rotation length of the image bearing member. The position detecting unit detects positional displacement on the basis of the detection result of the positional displacement detection image formed within the one-rotation length. The light-quantity adjusting unit determines the light-emission quantity when detecting the density, on the basis of the detection result of the light-quantity adjustment image formed within the one-rotation length using the light-emission quantity provided when emitting the light onto the positional displacement detection image. For example, while maintaining the precision with which the image density is controlled, the image density can be quickly controlled.

Further features of the present invention will become apparent from the following description of exemplary embodiments with reference to the attached drawings, in which like reference characters designate the same or similar parts throughout the figures therein.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

A first exemplary embodiment will be described as follows. A description will hereunder be given of an example in which adjustment of light quantity of a light-emitting element of an optical detecting sensor 40, which is required when controlling image density, is previously performed using a period of a color-misregistration correction controlling operation (which is periodically performed) and light quantity that is the same/substantially the same as light quantity used for the a color-misregistration correction controlling operation. When the light quantity for density control is previously adjusted, it is no longer necessary to adjust the light quantity when controlling the image density, so that the image density can be controlled in a shorter time. Specifically, the time is reduced due to elimination of the light quantity adjustment performed during the image density control and cleaning operation performed due to this light quantity adjustment. In the color-misregistration correction controlling operation, a light-quantity adjustment patch for controlling the image density is added within one rotation of an intermediate transfer belt, so that an additional cleaning operation is not required. Therefore, the time required for the color-misregistration correction controlling operation itself is not increased. A detailed description will hereunder be given with reference to the drawings.

Figure 1:
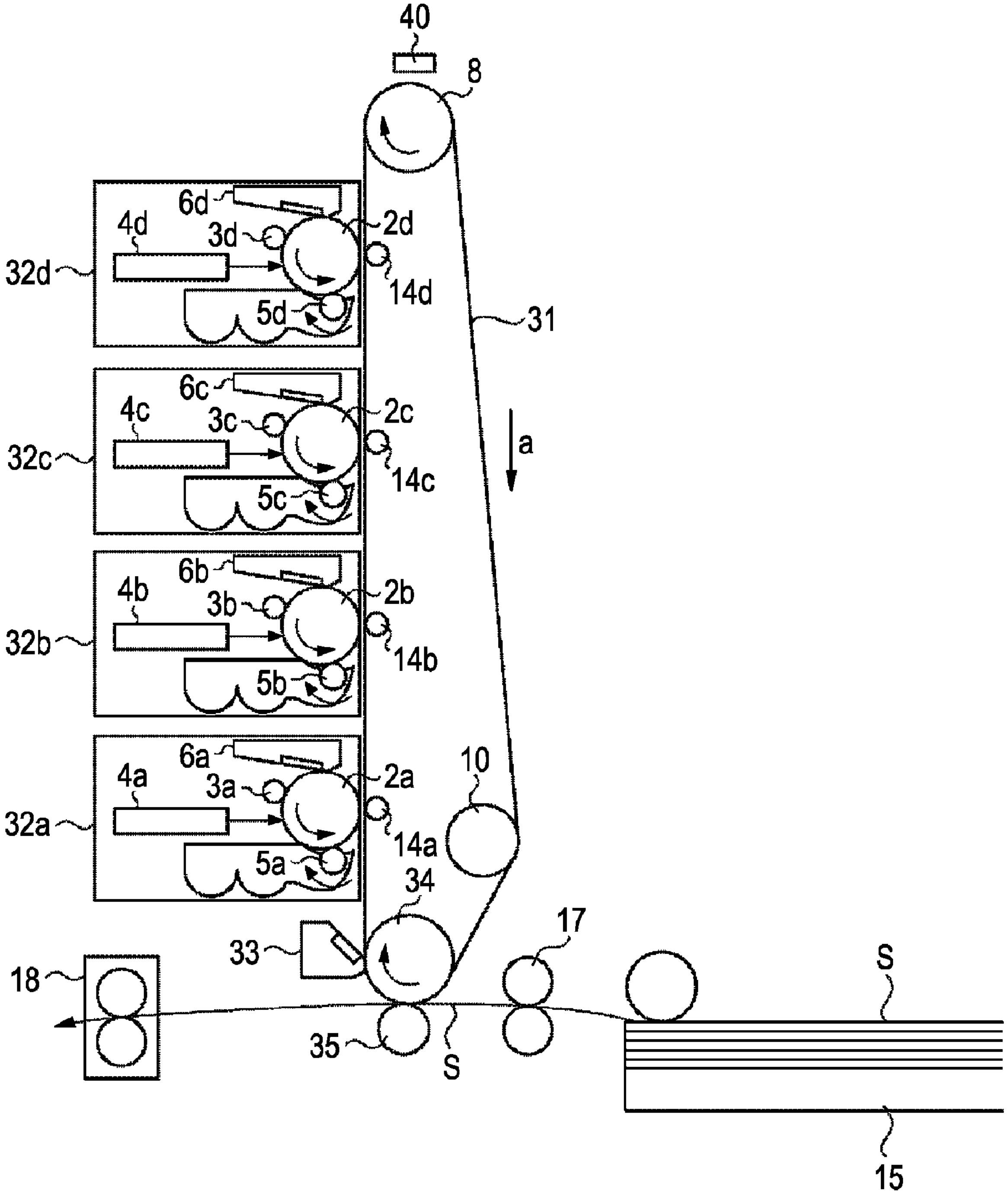
FIG. 1 is a schematic sectional view of an image forming apparatus according to an embodiment of the present invention.

Schematic Sectional View of Image Forming Apparatus: FIG. 1

FIG. 1 is a schematic sectional view of a four-color image forming apparatus according to the embodiment. The four-color image forming apparatus uses yellow (Y), magenta (M), cyan (C), and black (Bk) and an electrophotography process used in the embodiment. Although the four-color image forming apparatus will hereunder be described, the invention of the subject application is obviously applicable to, for example, a six-color image forming apparatus.

Referring to FIG. 1, the image forming apparatus has a structure in which process cartridges 32, which are removable from the main body of the apparatus, are disposed vertically in parallel. In FIG. 1, the symbols a, b, c, and d, which are added after their respective numbers, denote respective colors. The process cartridges 32 will hereunder be described without using the symbols a, b, c, and d. The process cartridges 32 comprise respective Y, M, C, and Bk photosensitive drums 2, developing units for developing toner on the respective photosensitive drums 2, and cleaning units for removing residual toner on the respective photosensitive drums 2. Toner images of different colors formed at the respective process cartridges (image forming stations) 32 are successively superimposed upon each other on an intermediate transfer belt 31 (serving as an image bearing member) to transfer the toner images to the intermediate transfer belt 31. Then, the toner images are transferred all together onto a transfer material S to form a full color image. The transfer material S is fed from a sheet-feed unit 15, and discharged to a sheet-discharge tray (not shown).

Each photosensitive drum 2 is an electrophotography photosensitive member that is a rotating drum, that is repeatedly used, and that is rotationally driven at a predetermined peripheral speed (process speed). Each photosensitive drum 2 is uniformly charged to a predetermined polarity/electrical potential (which is negative in the embodiment) by its corresponding primary charging roller (charging unit) 3. Then, each photosensitive drum 2 is subjected to image exposure by its corresponding image exposure unit 4 (comprising, for example, a laser diode, a polygon scanner, or a lens unit), to form an electrostatic latent image of corresponding one of a first color component image to a fourth color component image (such as a yellow, a magenta, a cyan, or a black component image).

Next, what is called development, in which toner (developing agent) is adhered to each electrostatic latent image formed on its corresponding image bearing member, is performed. Each development unit comprises its corresponding toner container, which contains toner, and a development roller (development section) 5, serving as a developing-agent bearing member that bears and conveys the toner. Each development roller 5 is formed of elastic rubber whose resistance is adjusted. While each development roller 5 rotates in a forward direction with respect to its corresponding photosensitive drum, each development roller is in contact with its corresponding photosensitive drum 2. By applying a high pressure of a predetermined polarity (negative in the embodiment) to the development rollers 5, the toner that is borne by the development rollers 5 that are friction-charged to a same polarity in their respective development sections is transferred to the electrostatic latent images on the photosensitive drums 2, to perform the development.

The intermediate transfer belt 31 (image bearing member) is rotationally driven by the action of a driving roller 8 at a speed that is substantially the same as those of the photosensitive drums 2 while contacting the photosensitive drums 2. Reference numeral 34 denotes a passive roller. The intermediate transfer belt 31 is placed in a tensioned state on a tension roller 10. The intermediate transfer belt 31 is formed of an endless film member having a thickness on the order of from 50 to 150 μm and having a volume resistivity of from $10^8$ to $10^{12}$ Ωcm. The intermediate transfer belt 31 is black and has high reflectivity. By an electrostatic action resulting from a high pressure applied to primary transfer rollers (primary transfer units) 14 disposed opposite to the respective photosensitive drums 2 with the intermediate transfer belt 31 being disposed therebetween, toner images of different colors are transferred to the intermediate transfer belt 31 from the photosensitive drums 2. Each primary transfer roller 14 is a solid rubber roller whose resistance is adjusted in the range of from $10^7$ to $10^9$Ω. Then, any primary transfer residual toner remaining on the photosensitive drums 2 after transferring the toner images from the photosensitive drums 2 to the intermediate transfer belt 31 is removed and collected by respective cleaning blades 6.

A transfer material S, fed from the sheet-feed unit 15, is fed towards a nip portion of the intermediate transfer belt 31 and a secondary transfer roller 35 by a pair of registration rollers 17 that are driven and rotated at a predetermined timing. Then, by electrostatic action resulting from applying high pressure to the secondary transfer roller 35, the toner images on the intermediate transfer belt 31 are transferred to the transfer material S. The secondary transfer roller 35 is a solid rubber roller whose resistance is adjusted in the range of from $10^7$ to $10^9$Ω. A full-color toner image is fixed to the transfer material S by heat and pressure using a fixing unit 18, after which the transfer material S having the full-color toner image fixed thereto is discharged to the outside of the apparatus (that is, outside of the main body of the image forming apparatus). Any secondary-transfer residual toner remaining on the intermediate transfer belt 31 after transferring the toner images onto the transfer material S from the intermediate transfer belt 31 is removed and collected by a cleaning blade 33 serving as a cleaning unit.

Figure 2:
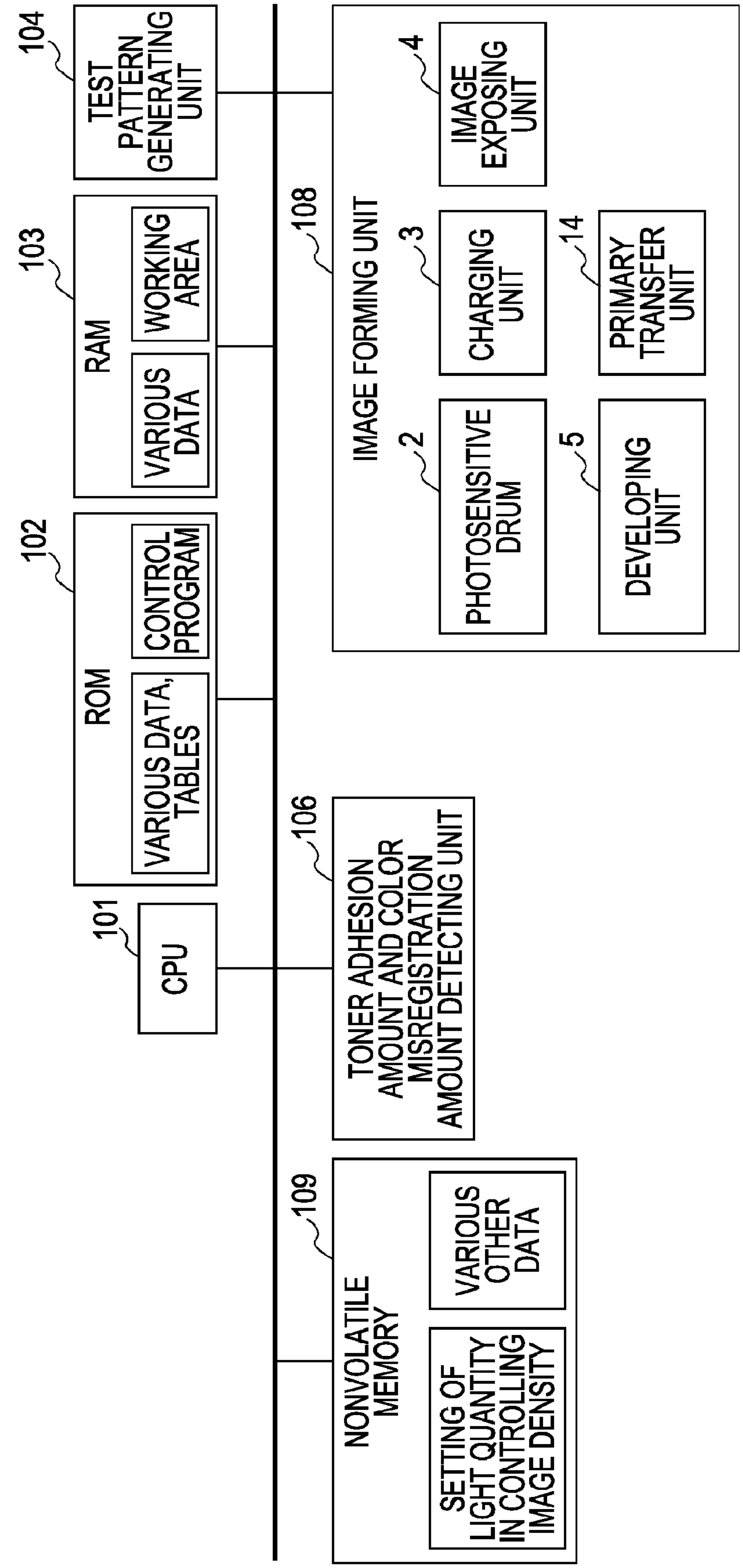
FIG. 2 is a block diagram of an exemplary structure of a controlling unit of the image forming apparatus.

Block Diagram of Image Forming Apparatus: FIG. 2

FIG. 2 is a block diagram of an exemplary structure of a controlling unit of the image forming apparatus.

Figure 14:
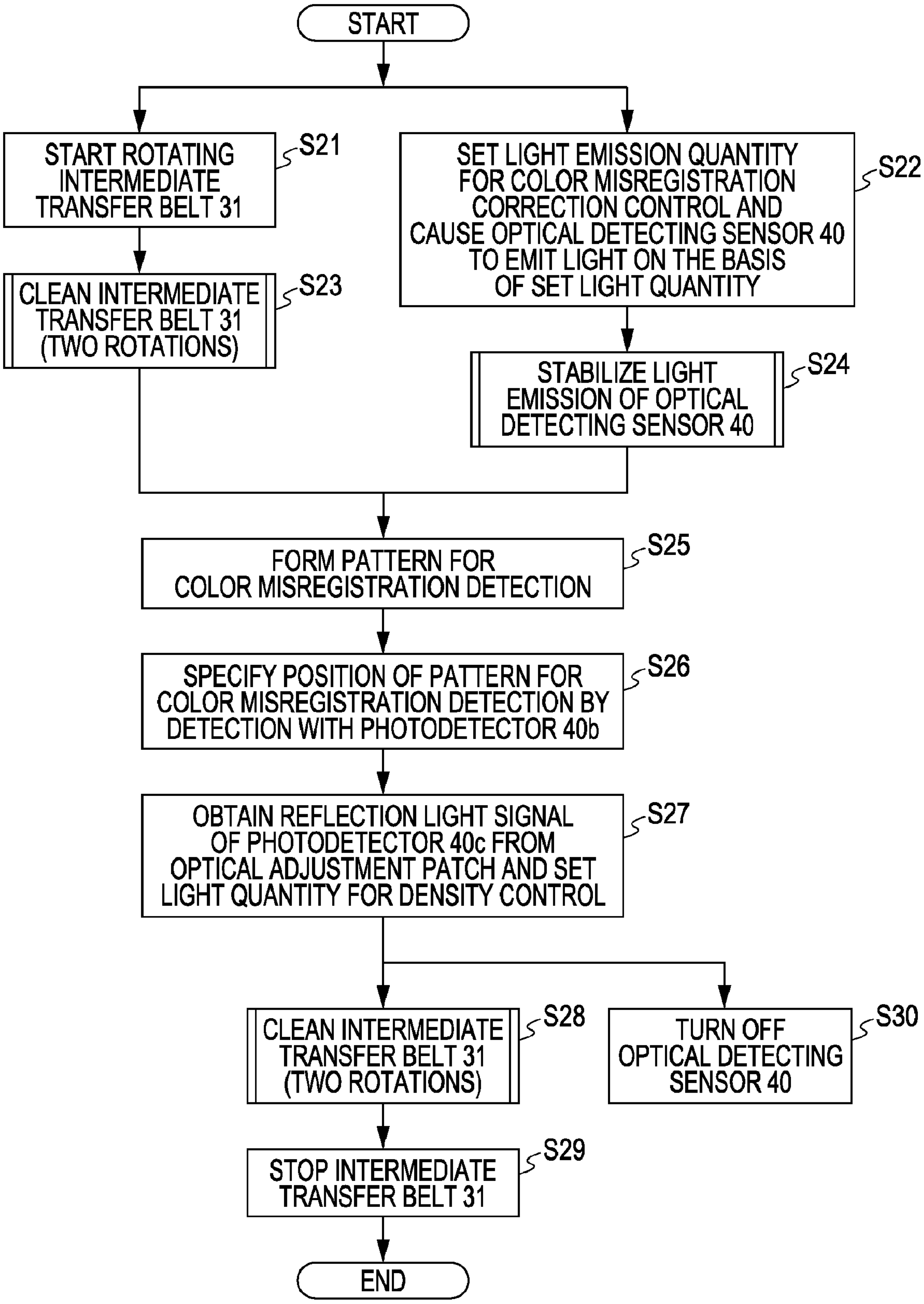
FIG. 14 is a flow chart of an example of a color-misregistration correction controlling operation and an operation for adjusting light quantity when performing image density control.

While controlling each section of the image forming apparatus using RAM 103 as a working area and on the basis of various control programs stored in ROM 102, a central processing unit (CPU) 101 reduces color variations of an image caused by environmental changes, to perform image density control for stabilizing color. For forming a color image with high precision, the CPU 101 performs, for example, a color-misregistration correction controlling operation for adjusting a timing of forming images of different colors. Further, the CPU 101 also performs calculation, gives instructions, controls each member, and receives data from a sensor (these operations are related to the steps in each flow chart described later). Environmental changes include, for example, (1) exchange of consumables, (2) changes in environment of use of the image forming apparatus (temperature, humidity, deterioration of the apparatus), and (3) changes in condition of use of the consumables (number of prints). ROM 102 stores various control programs, various items of data, and various tables. RAM 103 includes, for example, a program load area, a working area of the CPU 101, and storages areas of various items of data. Reference numeral 104 denotes a test pattern generating unit that generates a toner image of a patch or a line. Reference numeral 106 denotes a toner-adhesion-amount and color-misregistration-amount detecting unit including, for example, the optical detecting sensor 40 that detects a toner image (patch), such as a density-adjustment patch or a light-quantity adjustment patch (also called a light-quantity adjustment image), formed on the intermediate transfer belt 31. An image forming unit 108 includes, for example, the aforementioned photosensitive drums 2, the charging units 3, the image exposure units 4, the development units 5, and the primary transfer units 14. Reference numeral 109 denotes a non-volatile memory that stores various items of data, including, for example, light-quantity settings when executing image density control. The light-quantity settings used when executing image density control are stored in the non-volatile memory by executing the steps of a flow chart shown in FIG. 14 (described later) before executing the steps of a flow chart shown in FIG. 7. When the steps of the flow chart shown in FIG. 14 are not executed, initial values are stored in the non-volatile memory.

Although, in the embodiment, the various operations are carried out on the basis of the operations of the CPU 101, some or all of the operations that are performed by the CPU 101 can be performed by an application specific integrated circuit (ASIC). Alternatively, some or all of the operations performed by the ASIC can be performed by the CPU 101.

Figure 3:
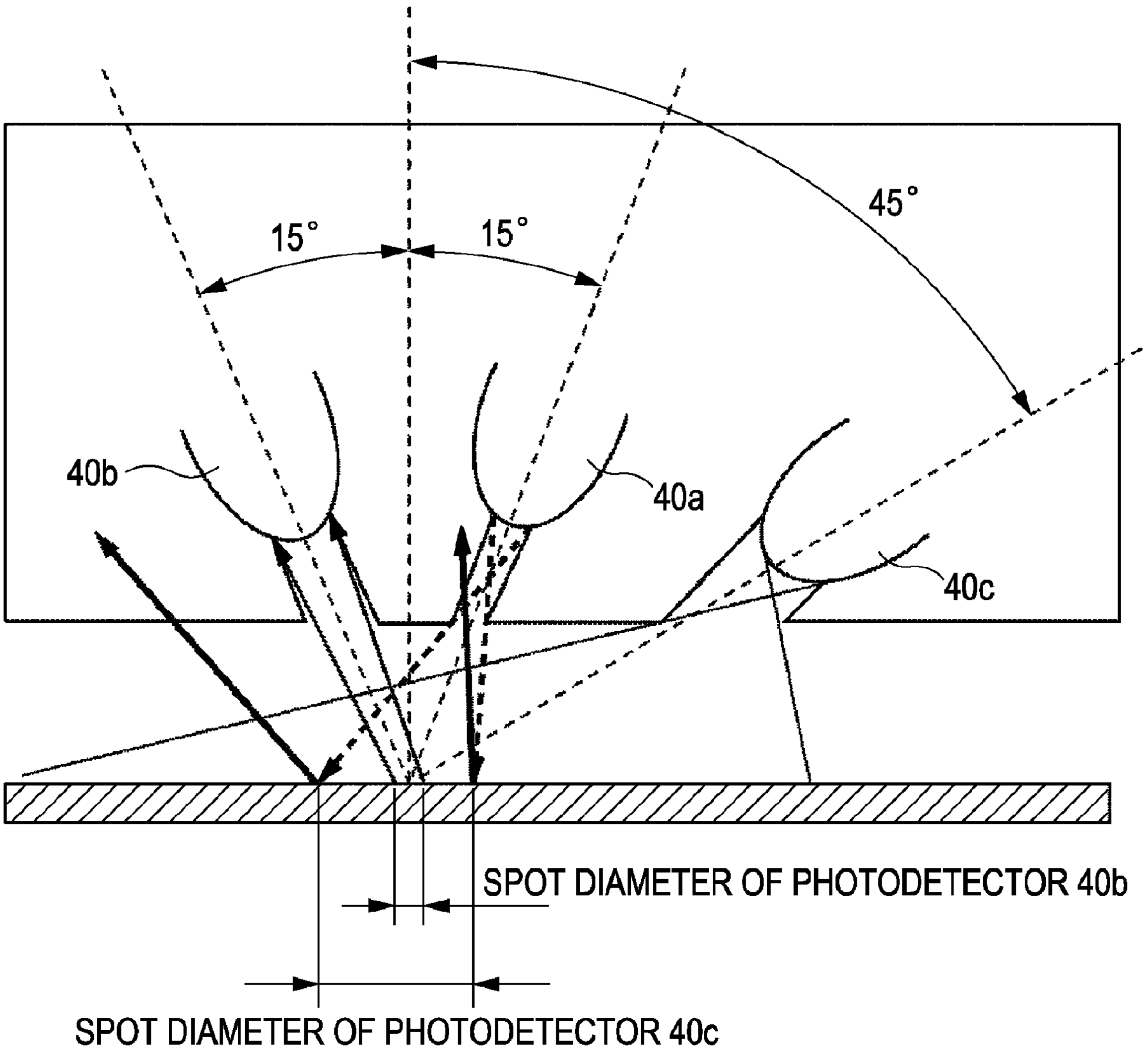
FIG. 3 is a structural view of an exemplary density detecting sensor.

Optical Detecting Sensor: FIG. 3

Next, the optical detecting unit 106 will be described in detail with reference to FIG. 3.

As shown in FIG. 1, in the image forming apparatus, the optical detecting sensor 40, serving as an optical detecting unit, is disposed opposite to the intermediate transfer belt 31. As shown in FIG. 3, the optical detecting sensor 40, serving as an optical detecting unit, comprises a light-emitting element (light-emitting diode) 40*a* (having a wavelength of 950 nm), a photodetector 40*b* and a photodetector 40*c* (which are, for example, photodiodes), and a holder. The intermediate transfer belt 31, itself, or patches or lines (position detection images) of various colors on the intermediate transfer belt 31 are irradiated with infrared light from the light-emitting element 40*a*, to measure reflected light at the photodetectors 40*b* and 40*c*. This measurement makes it possible to calculate the state of the intermediate transfer belt 31, the toner adhesion amount, and the toner positional displacement amount (color misregistration amount). In the optical detecting sensor 40, an irradiation angle of the light-emitting element 40*a* is 15 degrees, a light-reception angle of the photodetector 40*b* is 15 degrees, and a light-reception angle of the photodetector 40*c* is 45 degrees. Here, the reflected light from the patches or lines include a specular reflection component or an irregular reflection component. The photodetector 40*b* detects both a specular reflection component and an irregular reflection component, while the photodetector 40*c* only detects an irregular reflection component.

Figure 4:
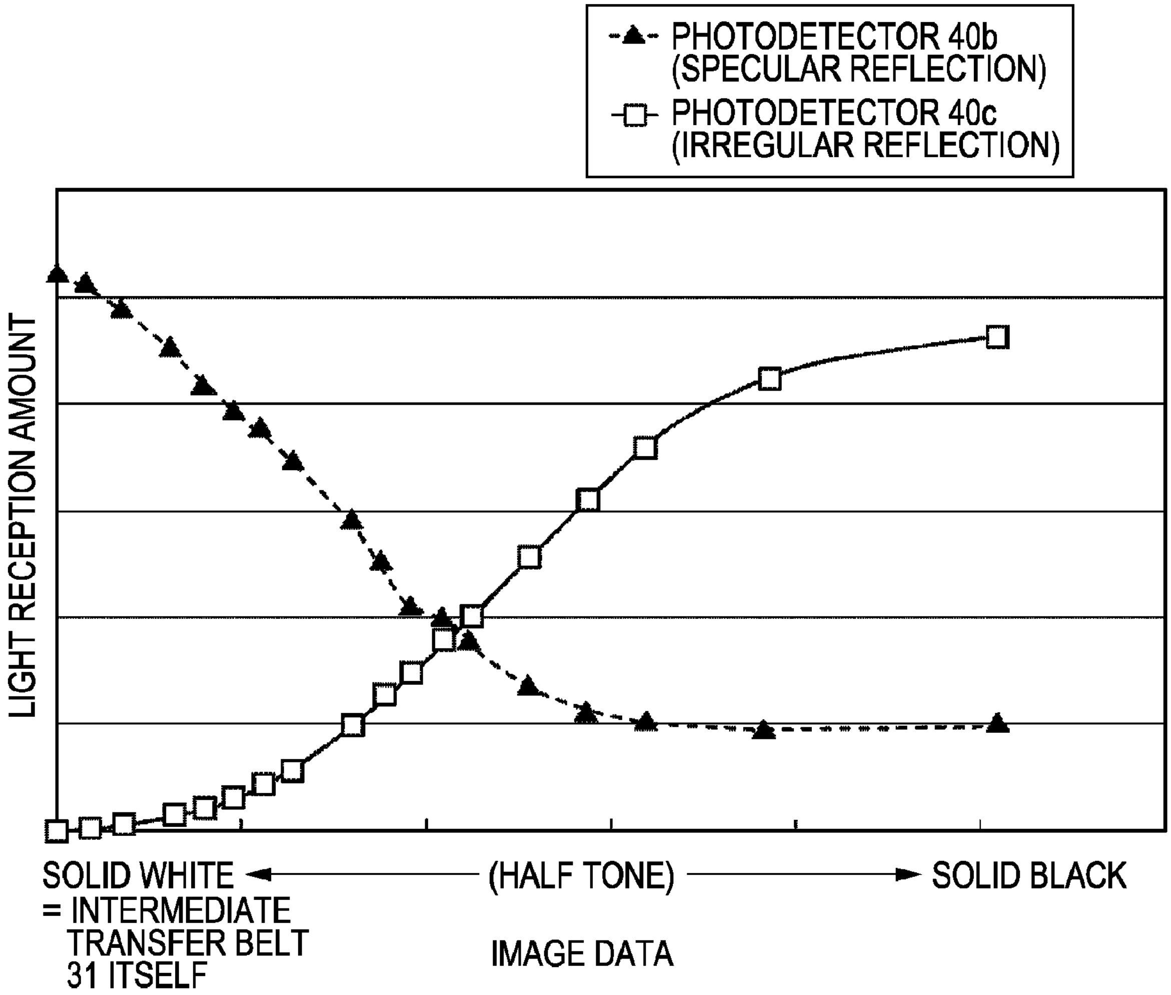
FIG. 4 shows an example of an output of a photodetector when a light-emission quantity is normal.

As shown in FIG. 4, when toner adheres to the intermediate transfer belt 31, the toner blocks light, thereby reducing specular reflected light, that is, output of the photodetector 40*b*. On the other hand, black toner absorbs infrared light having a wavelength of 950 nm used in the embodiments, whereas yellow, magenta, and cyan toner irregularly reflect the infrared light having a wavelength of 950 nm. Therefore, when toner adhesion amount at the intermediate transfer belt 31 is increased, the output of the photodetector 40*c* becomes large for the yellow, magenta, and cyan toner. The photodetector 40*b* is also affected by the increase in the toner adhesion amount. That is, for the yellow, magenta, and cyan toner, even if the toner adhesion amounts are large, so that the toner completely protects the intermediate transfer belt 31 from light, the output of the photodetector 40*b* does not become zero. To minimize the influence of the irregular reflection component, an aperture diameter of the photodetector 40*b* is smaller than that of the photodetector 40*c*. Here, in the optical detecting sensor 40, the aperture diameter of the light-emitting element 40*a* is 0.7 mm, the aperture diameter of the photodetector 40*b* is 1.5 mm, and the aperture diameter of the photodetector 40*c* is 2.9 mm. A detection range of the specular reflection component of the photodetector 40*b* is on the order of $\phi$1.0 mm, and a detection range of the irregular reflection component of the photodetector 40*c* corresponds to spreading of irradiation using the light-emitting element 40*a* and is on the order of $\phi$3.0 mm. The detection ranges will hereunder be referred to as the spot diameters of the photodetectors 40*b* and 40*c*.

Necessity of Image Density Control

Next, the image density control will be described.

In general, in the electrophotography color image forming apparatus, characteristics of toner or the aforementioned individual key parts change due to various conditions, such as (1) exchange of consumables, (2) changes in environment of use of the image forming apparatus (temperature, humidity, deterioration of the apparatus), and (3) changes in condition of use of the consumables (number of prints). The changes in characteristics become noticeable as variations in image density or changes in color reproducibility. That is, due to these variations, a proper color reproducibility can no longer be obtained. To overcome this problem, in the embodiment, for obtaining a precise color reproducibility at all times, a plurality of patches (density detection images) are formed experimentally to detect their densities with the optical detecting sensor 40, while changing image formation conditions when image formation carried out on the basis of an instruction given by a user is not performed. Then, on the basis of a detection result thereof, the image density control is executed as a density detecting operation for controlling a factor that influences image density. The image density control refers to changing the factor that influences the image density and adjusting or updating an image formation condition. Typical examples of the factors which influence the image density are charging bias, development bias, exposure strength, and a lookup table. Hereunder, updating/adjusting a lookup table (refer to FIGS. 12 and 13 described later) will be used as an example of the image density control. However, the image density control is not limited to only controlling a lookup table, so that, for example, charging bias, development bias, exposure density, etc., can be adjusted/updated, which are typical examples mentioned above. Specific operations of the image density control will be described in more detail with reference to FIG. 7 (described later).

Necessity of Adjusting Light Quantity for Image Density Control

Next, light quantity adjustment as a light quantity adjustment method performed prior to the image density control according to the embodiment will be described.

Figure 5:
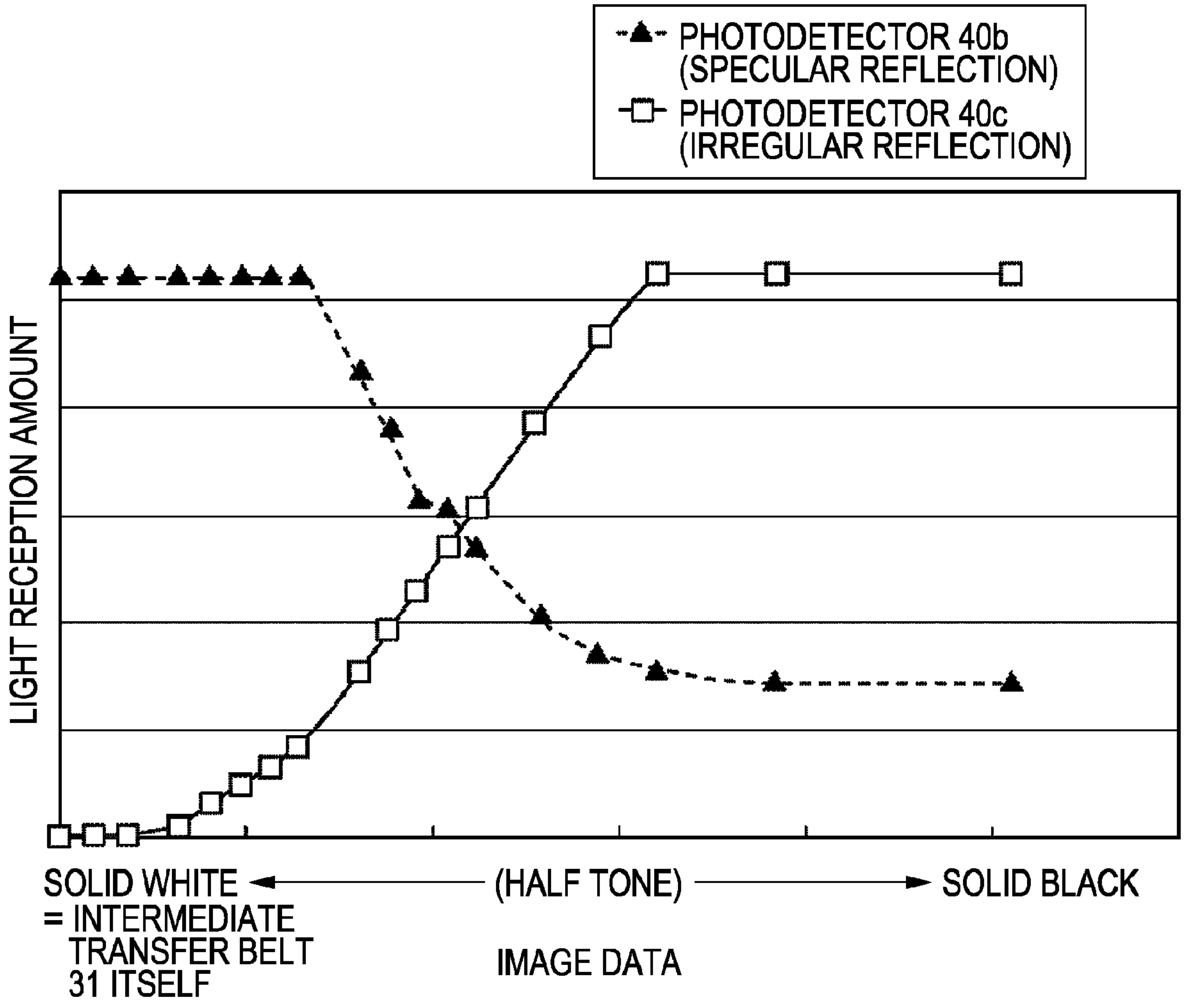
FIG. 5 shows an example of an output of the photodetector when the light-emission quantity is too large.
Figure 6:
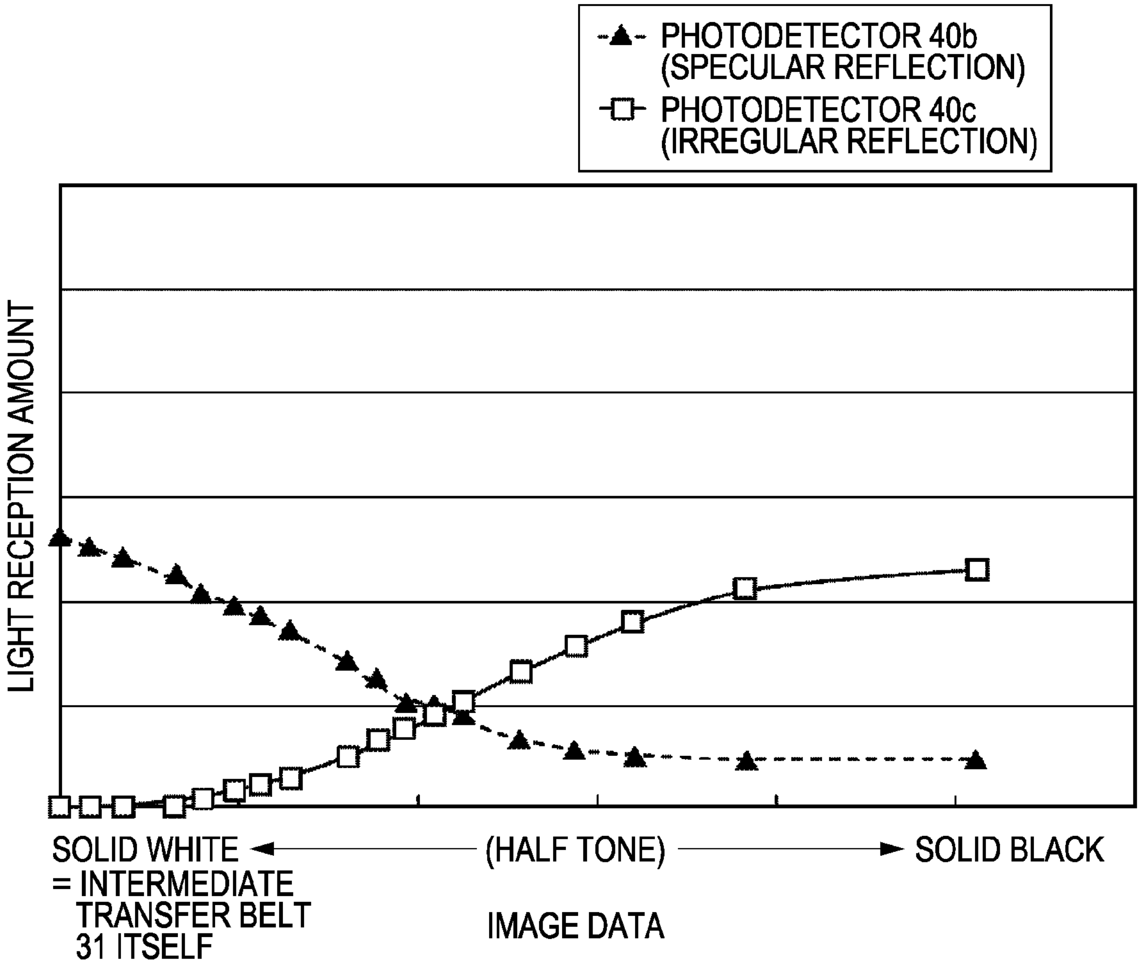
FIG. 6 shows an example of an output of the photodetector when the light-emission quantity is too small.

As shown in FIG. 4, it can be understood that there is a correlation relationship between outputs of the photodetectors 40*b* and 40*c* and toner adhesion amount. When light-emission quantity is too large, as shown in FIG. 5, in an area where the toner adhesion amount is small, the output of the photodetector 40*b* is fixed to an upper limit; whereas in an area where the toner adhesion amount is large, the output of the photodetector 40*c* is fixed to an upper limit. In this state, the toner adhesion amount cannot be precisely calculated. As shown in FIG. 6, when the light-emission quantity is too small, changes in the outputs of the photodetectors 40*b* and 40*c* with respect to a change in the toner adhesion amount become small. When the changes are converted to the toner adhesion amount, errors become large.

That is, for precisely performing the image density control, as shown in FIG. 4, it is important that the light quantity of the light emitting element be selected so that the outputs of the photodetectors 40*b* and 40*c* are not fixed to their respective upper limits, and so that a wide detection range can be obtained with respect to a change in the toner adhesion amount. The outputs of the photodetectors change due to, for example, color changes with time of the surface of the intermediate transfer belt 31 (which is a detection surface), staining with time of the optical detecting sensor, or lot variations of structural components of the optical detecting sensor. Therefore, it is necessary to periodically perform corrections for reconsidering at all times a proper light-quantity setting of the light-emitting element used in the image density control (that is, adjust light quantity). Specific operations for adjusting the light quantity will be described below.

Necessity of Color-Misregistration Correction Control (Positional Displacement Correction Control)

As mentioned above, in the electrophotography color image forming apparatus, the characteristics of the above-described components change due to various conditions, such as (1) exchange of consumables, (2) changes in environment of use of the image forming apparatus (temperature, humidity, deterioration of the apparatus, etc.), and (3) changes in the number of prints. Changes in characteristics, such as endurance wearing of the driving roller 8, expansion/contraction due to temperature or humidity, or variations in the positions of the photosensitive drums 2 that are irradiated with laser using the image exposure unit 4, become noticeable as color variations in which toners of different colors no longer are precisely superposed upon each other when forming a color image.

Accordingly, for obtaining precise color reproducibility at all times, in the embodiments, when image formation carried out on the basis of an instruction given by a user is not performed, line images of a plurality of colors are experimentally formed to detect them with the optical detecting sensor 40. Then, on the basis of a detection result, color-misregistration adjustment control for adjusting a timing (main scanning direction, subscanning direction) of forming an image is executed with each color. Specific operations for the color-misregistration correction control will be described below.

Accordingly, the color image forming apparatus according to the embodiment forms at least three types of patches, that is, patches (lines) for color-misregistration control (which has been just described), patches for density control (described above), and light quantity adjustment patches for the density control (described above). These may be called, for example, first detection images, second detection images, and third detection images, respectively, to distinguish between the patches.

Specific Example of Image Density Control

Figure 7:
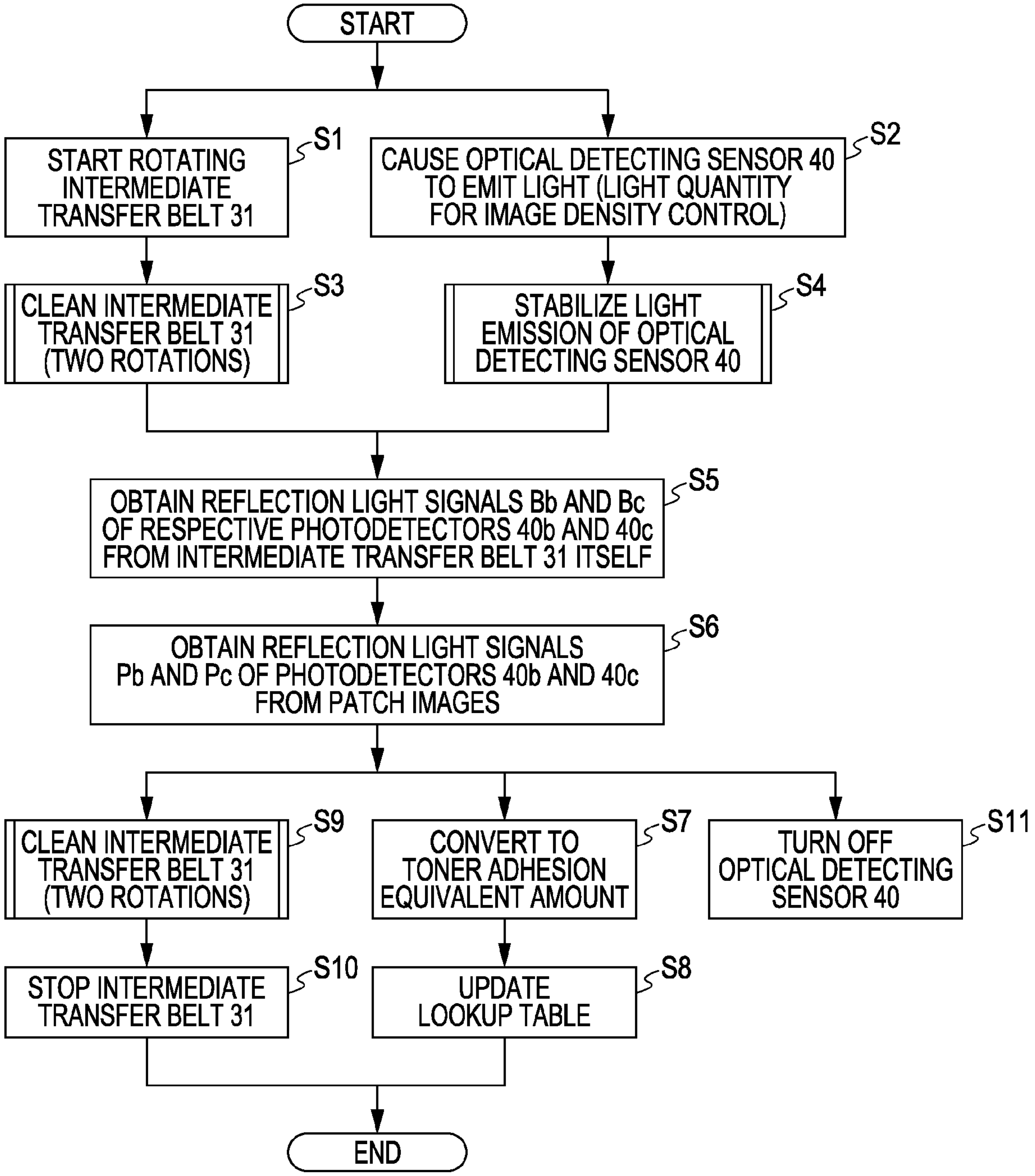
FIG. 7 is a flow chart of an image density control.

Next, a specific example of image density control according to the embodiment will be described with reference to FIGS. 7 and 8. First, in Step S1, when image density control is started, the intermediate transfer belt 31 starts to rotate. When the intermediate transfer belt 31 rotates, in Step S2, a light quantity setting stored in the non-volatile memory 109 (non-volatile storage unit 109) and used when executing image density control is read to cause the optical detecting sensor 40 to emit light. The operation of Step S2 makes it possible to reduce the time required for adjusting light quantity (performed during the image density control) and the time required for a cleaning operation performed in association with the light quantity adjustment during the image density control. As a result, the time required for the image density control can be reduced.

Next, in Step S3, the intermediate transfer belt 31 is rotated twice, and toner adhered to the intermediate transfer belt 31 is removed by the action of the cleaning blade 33. Depending upon the case, the intermediate transfer belt 3 may be rotated three or more times.

Next, when, in Step S4, the light emission of the optical detecting sensor 40 is stabilized, in Step S5, obtaining of reflection-light signals Bb and Bc of the respective photodetectors 40*b* and 40*c* from the intermediate transfer belt 31, itself, is started. Then, when the intermediate transfer belt 31 has rotated one more time, patch images of respective colors (such as those shown below reference numeral 804 in FIG. 8) are formed. The Y, M, C, and K patches shown below reference numeral 804 in FIG. 8 are patches that are formed and detected when the intermediate transfer belt 31 rotates for the second time.

Then, in Step S6, at the centers of the patch images, reflection-light signals Pb and Pc from the respective photodetectors 40*b* and 40*c* are obtained. In this case, in Steps S5 and S6, a controlling operation is performed so that the signals at the same/substantially the same location of the intermediate transfer belt 31 are obtained. The centers of the patch images refer to the centers of the individual rectangular patches shown at the lower portion in FIG. 8.

In the embodiment, the entire patch images are disposed within a peripheral length of the intermediate transfer belt 31. This is to prevent a processing time from becoming long due to a plurality of cleaning operations being performed after ending the formation of the patches for one rotation, when the length of the entire patch images equals the length of the patch images formed on the intermediate transfer belt 31 that has rotated one or more times.

Then, when, in Step S11, the obtaining of the reflection-light signals Pb and Pc by the photodetectors 40*b* and 40*c* in Step S6 is completed, the light-emitting element 40*a* of the optical detecting sensor 40 is turned off.

In Step S7, for each patch, a toner adhesion equivalent amount is converted on the basis of the results of Steps S5 and S6. Various conversion methods are available. For example, using the signals Bb, Bc, Pb, and Pc, calculations can be carried out with the following Formula (1):

$$\text{Toner adhesion equivalent amount}=\{Pb-\alpha*(Pc-Bc)\}/Bb \qquad (1)$$

Here, α is a constant. The constant used may be one stored in RAM 103 or the nonvolatile memory 109 (calculated by a predetermined operation of the image forming apparatus) or one previously stored in ROM 102. The smaller the toner adhesion equivalent amount, the larger the toner adhesion amount actually is. The numerator of Formula (1) corresponds to a net specular reflected light (resulting from subtracting an irregular reflection component) that is received by the photodetector 40*b* when the patch images are irradiated with light.

Figure 9:
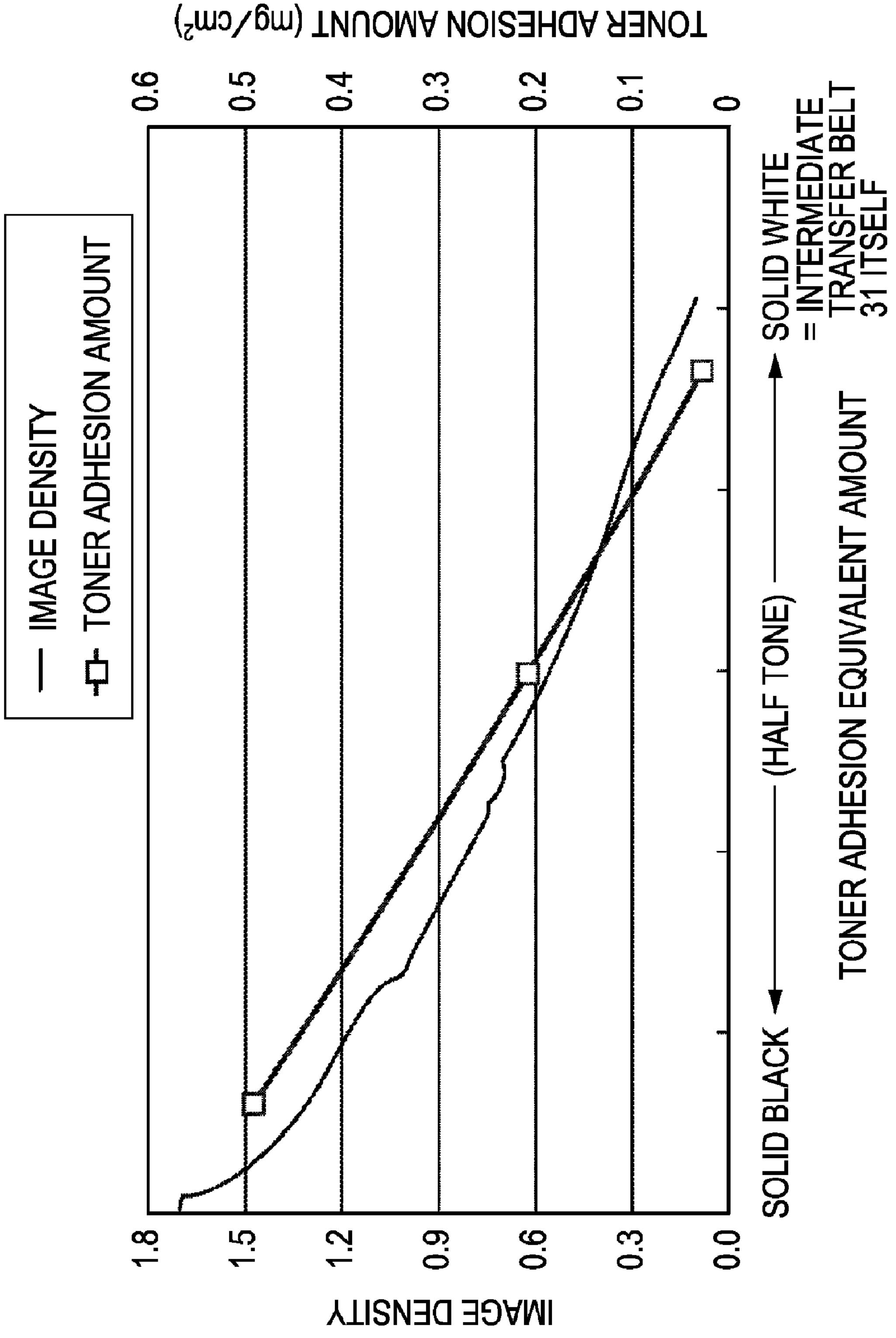
FIG. 9 is a graph for conversion to a toner adhesion equivalent amount or to density in terms of an image density control result.

Using a table, such as that shown in FIG. 9 incorporating ROM 102, the toner adhesion equivalent amount can be converted to toner adhesion amount or image density that is set when actually performing printing on paper. In converting the density on paper, a half-tone image (used as a patch) is printed on a Canon CLC-SK sheet having a basis weight of 80 g), to determine the correlation between the printed half-tone image and a result measured using RD918 (manufactured by Gretag Macbeth).

Thereafter, in Step S8, a lookup table is updated on the basis of a result of conversion to the toner adhesion amount or the image density. Then, after ending Step S6, an image formed on the intermediate transfer belt 31 is cleaned (for two rotations of the intermediate transfer belt 31) in Step S9 concurrently with the operations of Steps S7 and S8. Afterwards, when the cleaning ends, in Step S10, the rotation of the intermediate transfer belt 31 is stopped, thereby ending the image density control.

Details of Image Density Control

Figure 11:
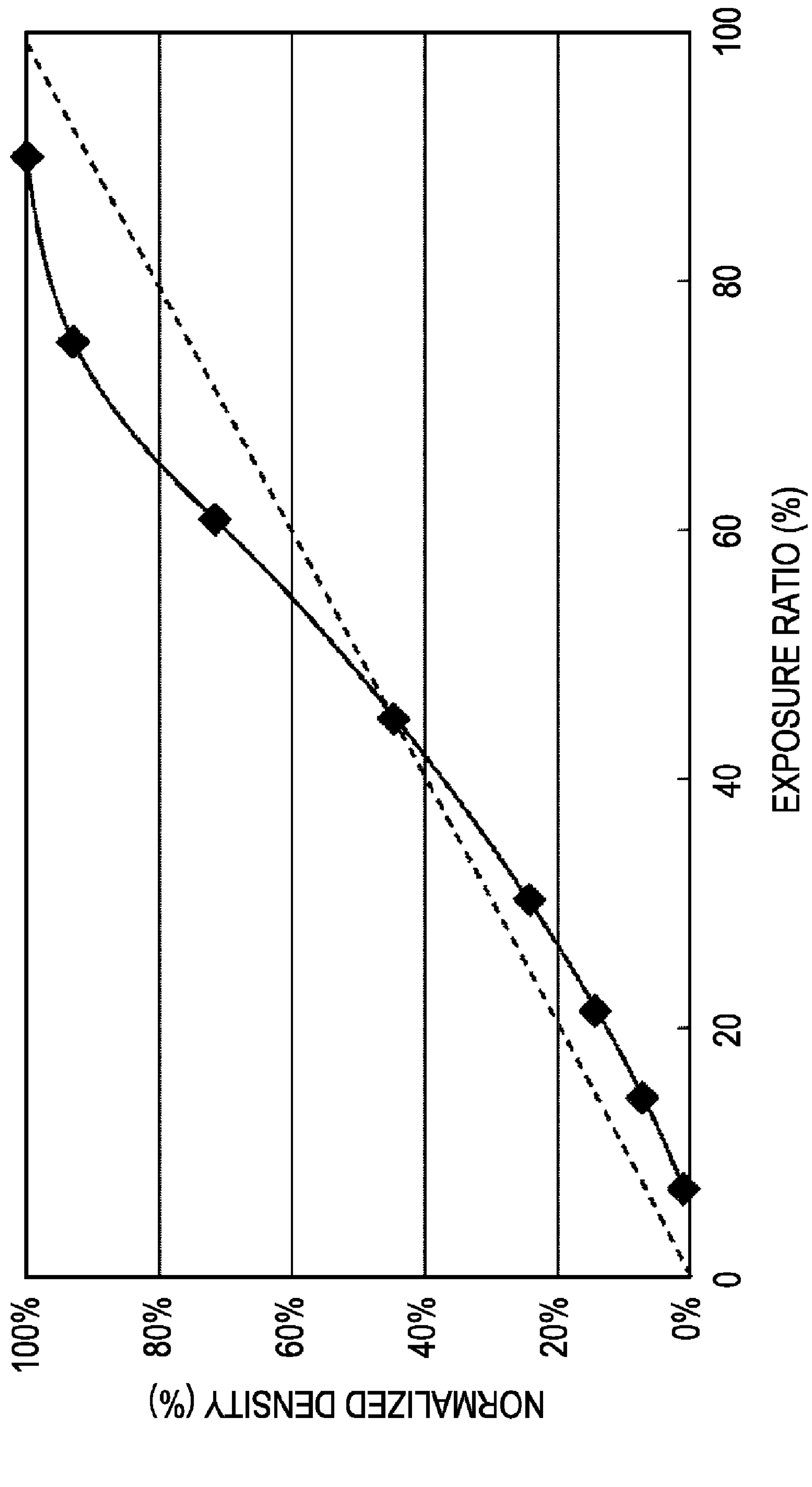
FIG. 11 is a graph of a prime γ curve.
Figure 12:
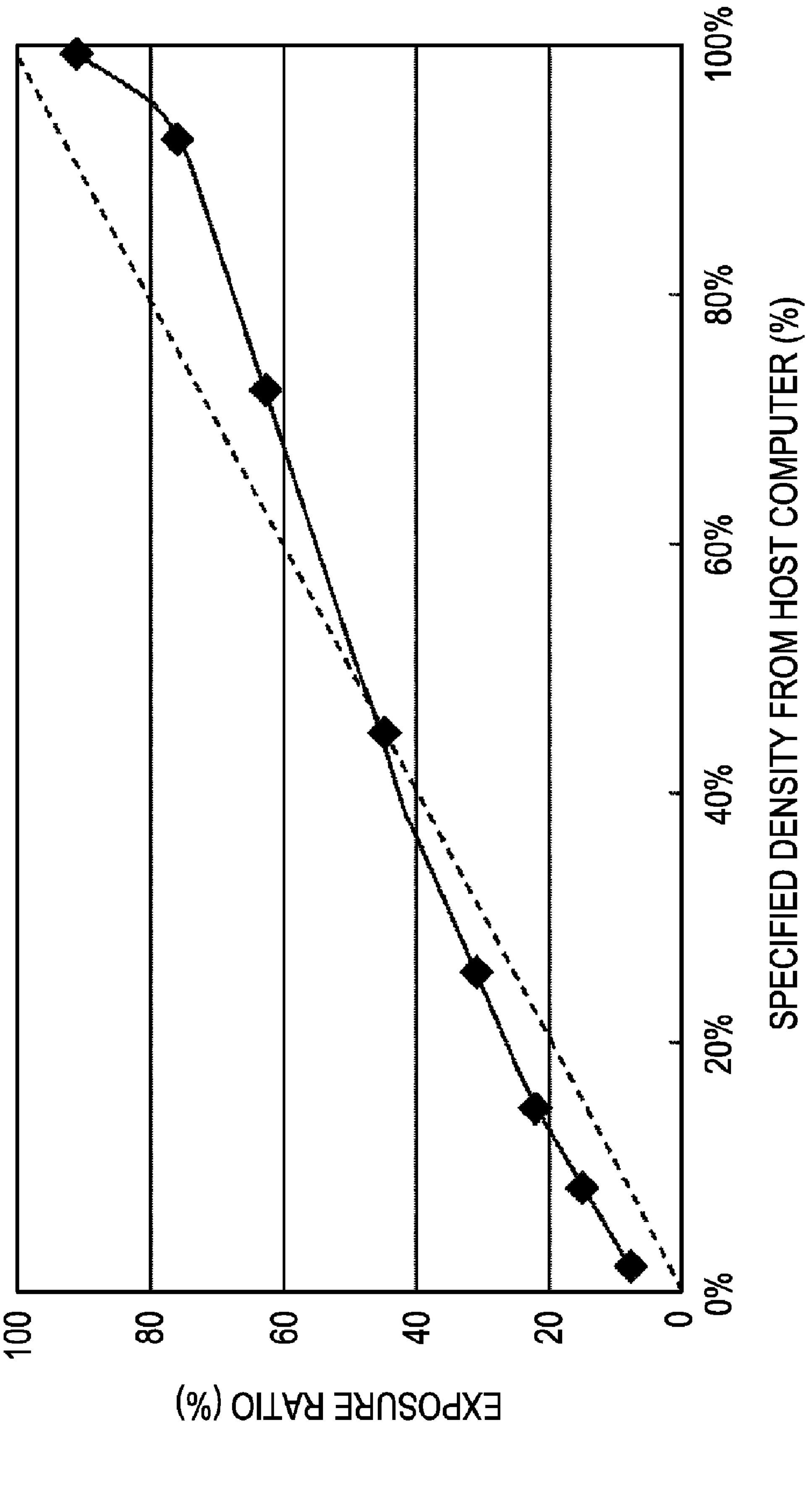
FIG. 12 is a graph of a lookup table.
Figure 13:
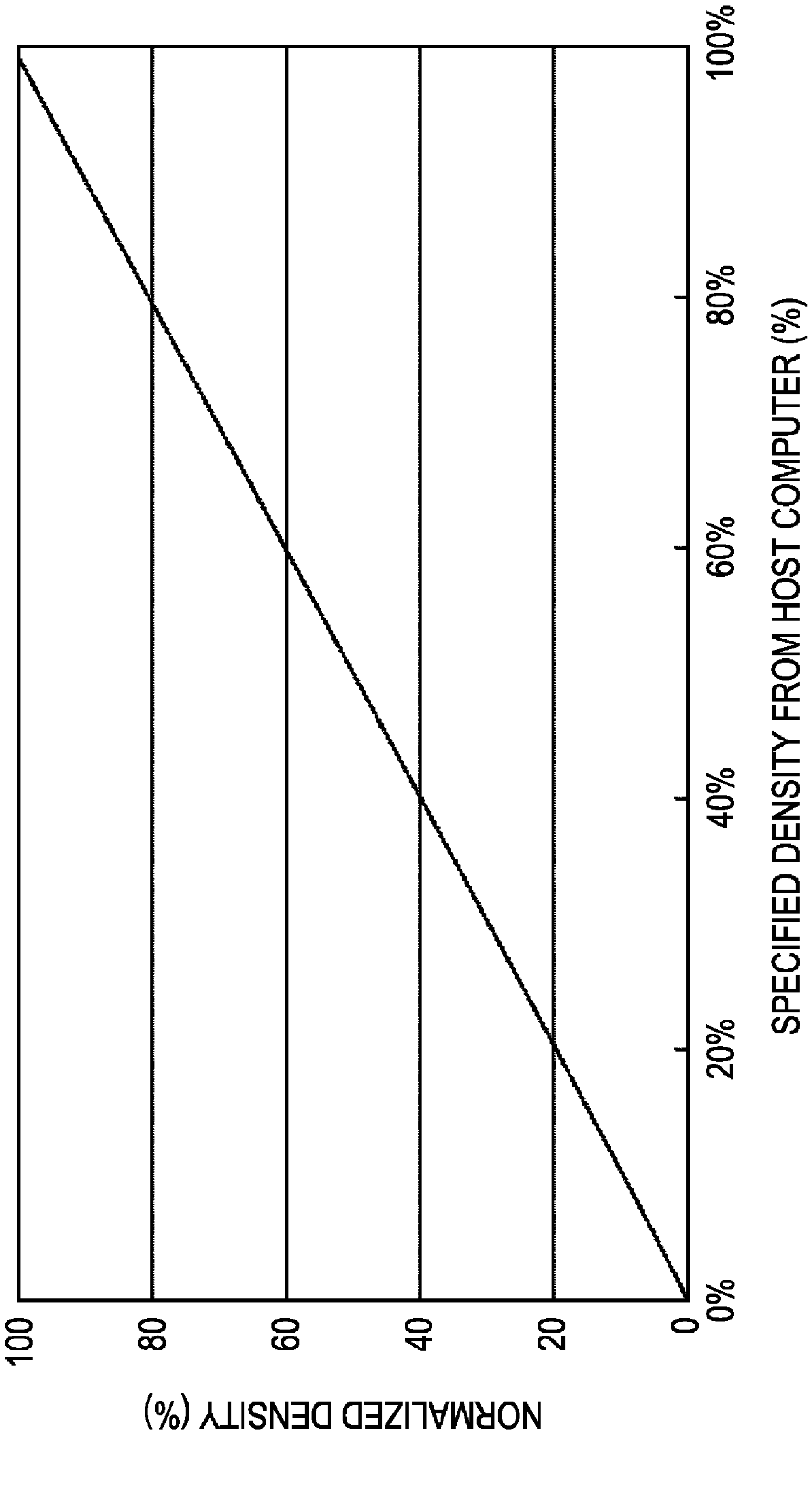
FIG. 13 is a graph of image density with respect to input image data after executing the image density control.

An example of the detailed operation of Step S8 shown in FIG. 7 will hereunder be described with reference to FIGS. 10 to 12. First a plurality of 8-mm×8 mm half-tone patterns, having the same size as a pitch image, are used. The patch size is determined considering that the spot diameter of the photodetector 40*c* is ϕ3.0 mm, that the toner amount tends to be ununiform at a patch edge, and that a plurality of samplings are performed at a patch center. These patterns are subjected to many-valued dither processing used in actually forming an image. Eight half-tone images having exposure ratios of 6%, 13%, 21%, 31%, 43%, 61%, 75%, and 90%, provided by the image exposure unit 4, are used as patches. The updating of the lookup table is schematically described as follows.

Figure 10:
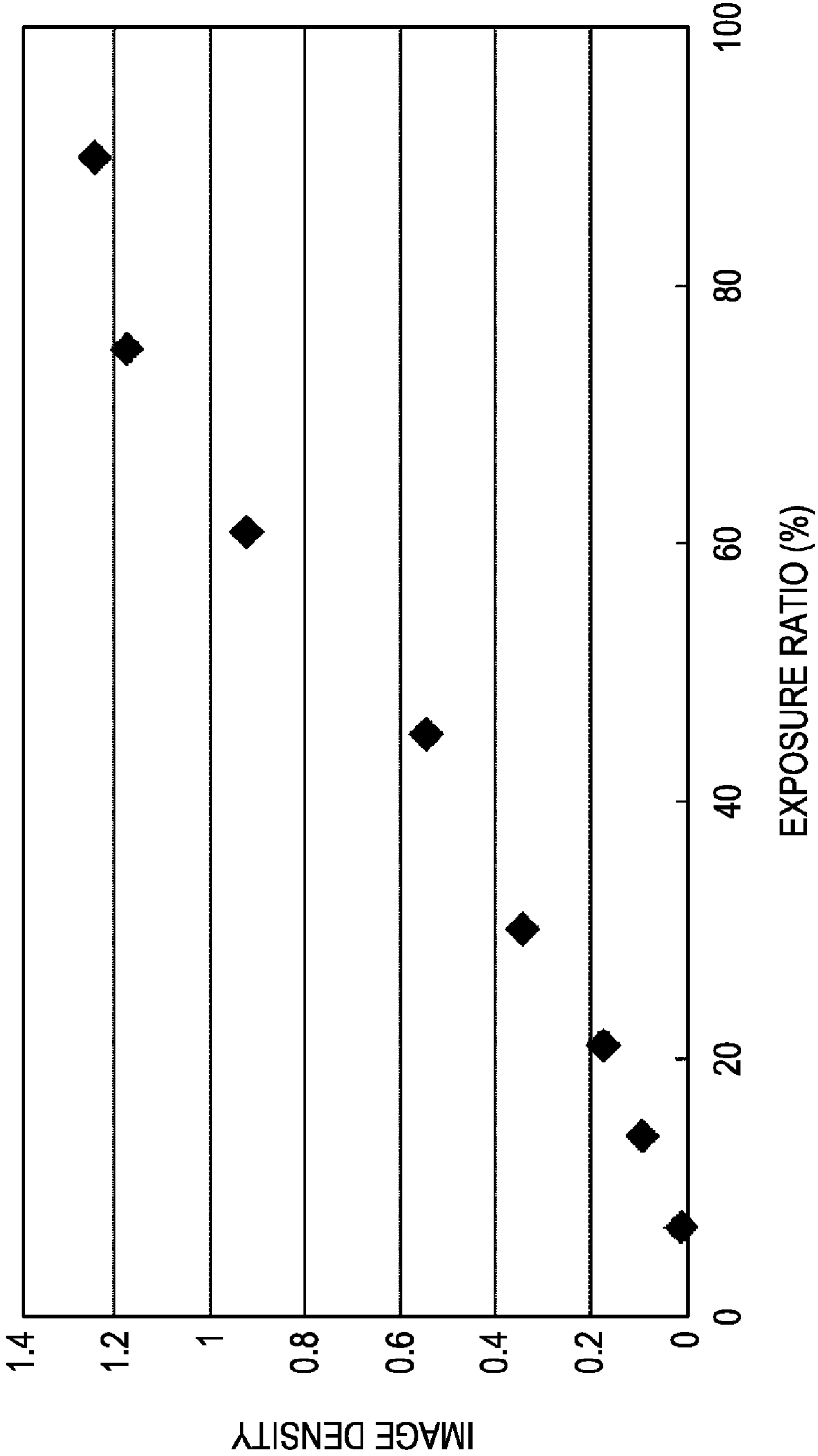
FIG. 10 is a graph showing the relationship between image density and exposure ratio.

The horizontal axis of FIG. 10 represents exposure ratio (corresponding to gradation), and the vertical axis represents image density that is set when a sheet is printed. In FIG. 11, the image density is normalized using a maximum density (density when exposure time is 100%) estimated using FIG. 10, and each point is subjected to linear interpolation. This curve is called a "prime γ curve." A table in which the horizontal axis and the vertical axis of the "prime γ curve" are interchanged corresponds to the lookup table (FIG. 12). By forming an actual image by converting input image data from a host computer using the lookup table, a linear relationship (refer to FIG. 13) is established between an image density instruction from the host computer and the actual density, so that a precise image reproducibility can be realized.

Color-Misregistration Correction Control and Light-Quantity Adjustment When Controlling Image Density Next, the operations of the color-misregistration correction control and light-quantity adjustment when controlling image density in some embodiments will be described with reference to FIGS. 14 and 15. In some embodiments, a case in which the color-misregistration correction control is executed on the basis of an output from the photodetector 40*b* will be described.

In Step S21, when the color-misregistration correction control is started, the intermediate transfer belt 31 starts to rotate.

Next, in Step S22, a color-misregistration correction control light-emission quantity is set, and the optical detecting sensor 40 is caused to emit light with the set color-misregistration correction control light quantity. In general, an allowable range of precision with respect to the setting of the color-misregistration correction control light quantity is larger than a light-quantity setting provided when performing the image density control. This is because, as mentioned above, the color-misregistration correction control is performed so that a change of an edge of a line image is read. Here, for determining the light quantity for the color-misregistration correction control, for example, prior to the color-misregistration correction control, several light-quantity set values are allocated, to irradiate the intermediate transfer belt 31, itself, and to select the set value of the light quantity so that an output of the photodetector 40*b* falls within a predetermined range. In this case, compared to when an adjustment patch is formed as in the image density control, the required processing time can be reduced.

Next, in Step S23, the intermediate transfer belt 31 is rotated twice, to remove any residual toner adhered to (remaining on) the intermediate transfer belt 31 by the action of the cleaning blade 33.

Figure 15:
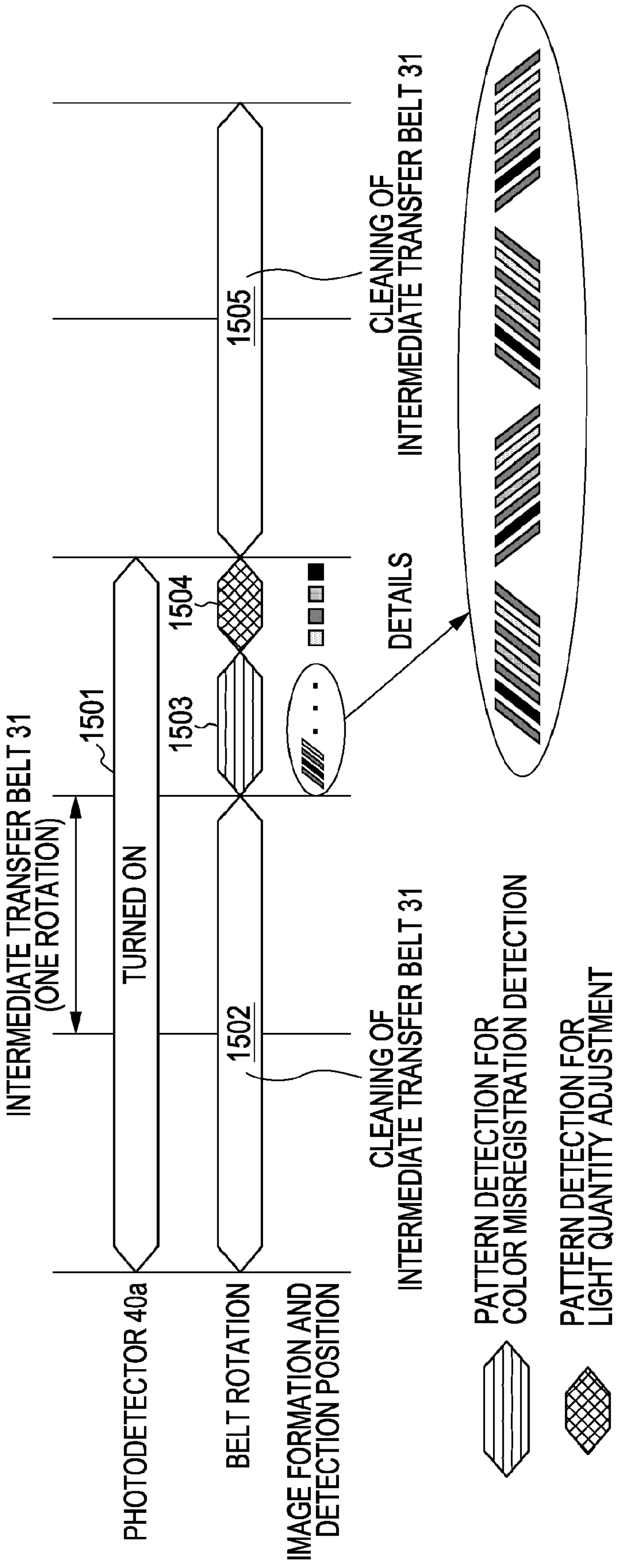
FIG. 15 illustrates an operation timing of the example of the color-misregistration correction controlling operation and the operation for adjusting light quantity when performing the image density control.

First, as indicated by reference numeral 1501 in FIG. 15, the light-emitting element (the light-emitting diode) 40*a* continues emitting light. In addition, as indicated by reference numeral 1502 in FIG. 15, the intermediate transfer belt 31 is cleaned for one or more rotations of the intermediate transfer belt 31. Next, when, in Step S24, the light emission of the optical detecting sensor 40 is stabilized, in Step S25, an oblique line image for the color-misregistration correction control is formed as a color-misregistration detection pattern on the intermediate transfer belt 31. The oblique line image has a length of 2 mm in the main scanning direction as shown in FIG. 15. Patches shown below reference numeral 1503 in FIG. 15 correspond to the oblique line image. At this time, light-quantity adjustment patches are also formed within one rotation of the intermediate transfer belt 31. Four square patches shown below reference numeral 1504 corresponds to the light-quantity adjustment patches. Here, the light-quantity adjustment patches are solid patches having an 8-mm×8 mm size which is the same as that of the patches used in the image density control. There are a total of four light-quantity adjustment patches having respective colors. Therefore, it does not take much time to detect the light-quantity adjustment patches, so that the time required for the color-misregistration correction control is not made considerably long. Although, in FIG. 15, the light-quantity adjustment patches are formed after forming the oblique line image, they may be formed before forming the oblique line image.

Next, in Step S26, positions of the line image are specified on the basis of variations in the output of the photodetector 40*b*. More specifically, a same line image is disposed on a line at an angle of 45 degrees and a line at an angle of −45 degrees with respect to an axis in a conveying direction of the belt, to specify main-scanning displacement amount and subscanning displacement amount of the line image. A main-scanning length of the line image is set considering that the spot diameter of the photodetector 40*b* used in the above-described color-misregistration correction control is ϕ1.0 mm and that changes in outputs at edges of the respective line images can be obtained. With regard to how to specifically correct color misregistration on the basis of the detected main-scanning displacement amount and the subscanning displacement amount, for example, a related method of adjusting a timing (main scanning direction, subscanning direction) of forming an image with each color is known. Therefore, details thereof will not be given here. For example, a technology of changing an image formation condition, such as changing a light-emission timing of a laser diode, from each determined color misregistration is also already well known. Therefore, details thereof will not be given here.

Next, in Step S27, subsequent to forming the oblique line image for the color misregistration detection, an output of the photodetector 40*c* corresponding to reflected light from the centers of the light-quantity adjustment patches for determining the light quantity for the image density control is obtained. The obtaining method is similar to that in controlling the image density. In Step S27, the light quantity setting provided when detecting the density is also set on the basis of the output of the photodetector 40*c*. Here, if the setting of the light quantity is changed when emitting light to the light-quantity adjustment patches, a long time is required until the output is stabilized. However, here, the light-quantity adjustment patches cannot be continuously read subsequent to the reading of the color-misregistration detection image. In contrast, in Step S27, when obtaining the output of the light-quantity adjustment patches, the optical detecting sensor 40 is caused to emit light with a light quantity that is the same or substantially the same as the light quantity setting for the color-misregistration correction control. The setting of the light quantity for the density control is actually performed by the time the density control is performed, so that it is not limited to a timing of Step S27.

Next, in Step S30, the light-emitting element 40*a* of the optical detecting sensor 40 is turned off after completing the obtainment of the output of the light-quantity adjustment patches from the photodetector 40*c*. With the operation of Step S30, for cleaning the image formed on the intermediate transfer belt 31 in Step S28, the intermediate transfer belt 31 is rotated twice. Then, in Step S29, the rotation of the intermediate transfer belt 31 is stopped. Accordingly, the color-misregistration control and the light quantity adjustment for the image density control end.

Method of Determining Light Quantity for Image Density Control

Figure 16:
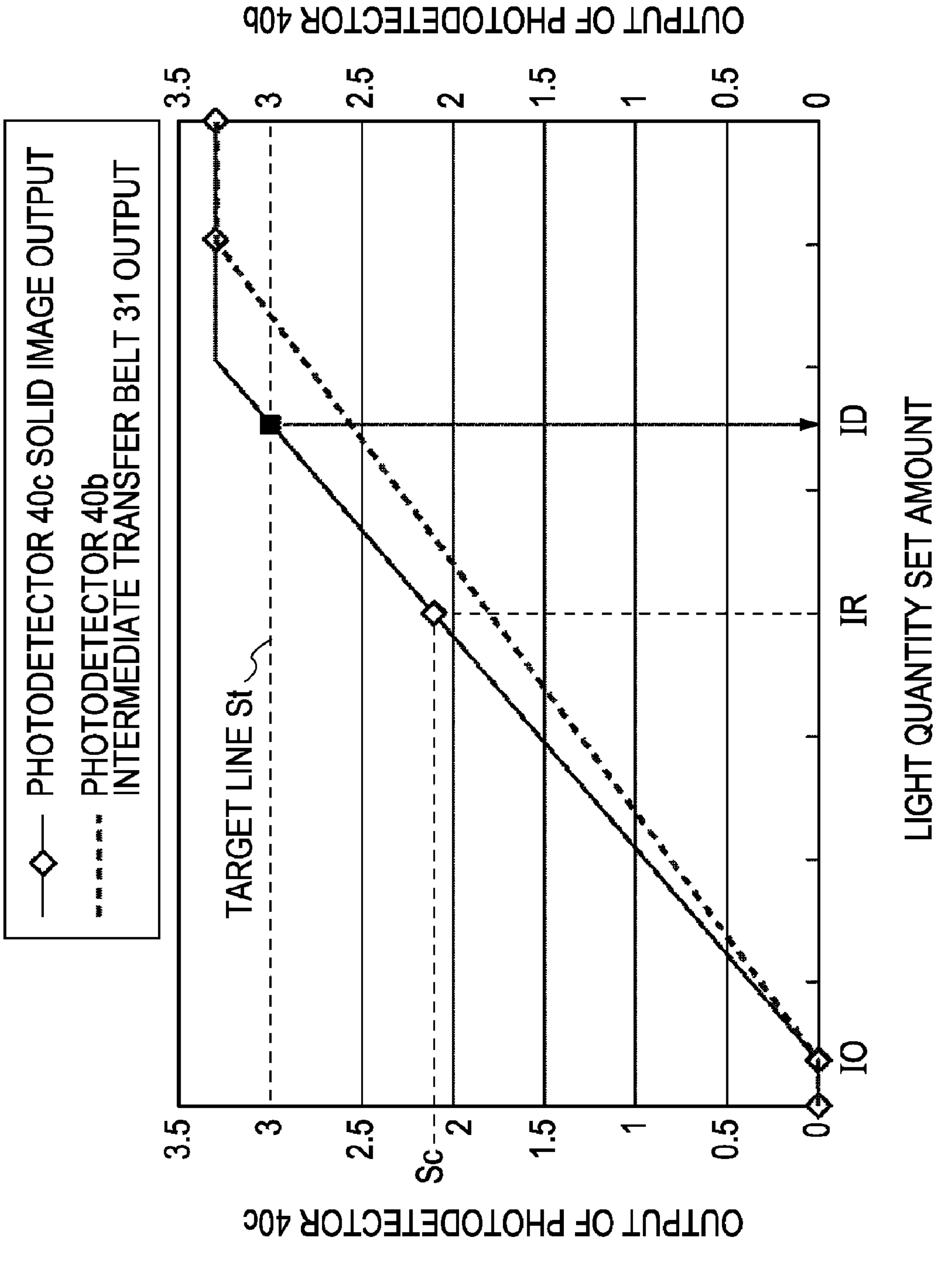
FIG. 16 is a graph showing an exemplary method of determining the light quantity when controlling the image density.

The light quantity adjustment for the density control will hereunder be described in more detail with reference to FIG. 16. FIG. 16 is a graph showing light-emission-quantity-versus-photodetector-output characteristics of a solid image and the intermediate transfer belt 31, in which the characteristics of the solid image have larger values than those of the intermediate transfer belt 31. It can be said that the graph shows a case corresponding to a case shown in FIG. 21 (described later) in which the intermediate transfer belt 31 has been used to a certain extent. The photodetector output characteristics refer to how much light the photodetectors receive and whether or not outputs of the photodetectors are performed in accordance with the detections, when irradiation is performed with light of a certain size. The photodetector output characteristics are sometimes called "light-emission-quantity-versus-detection-output characteristics." The light-emission-quantity-versus-photodetector-output characteristics for the intermediate transfer belt 31 are also given in the graph because they are required for measuring foundation density characteristics of the intermediate transfer belt when detecting the density, and because detection results of the intermediate transfer belt 31 need to be set within a normal range. The lines in the graph are formed by connecting two points (IO, 0) and (IR, Sc) with straight lines.

A predetermined value IO is predetermined on the basis of the characteristics of the photodetectors, and is the smallest detectable light quantity. In other words, by setting the light quantity greater than or equal to the predetermined value IO, light emission by the light-emitting element 40*a* is started. Since the predetermined value IO is a predetermined value, it is previously stored in the non-volatile memory 109. The storing of the predetermined value IO is performed by a storage control operation by the CPU 101.

IR is a setting of the color-registration-correction light quantity used when detecting the aforementioned light-quantity adjustment patches described above. IR is equivalent to the color-misregistration-correction light-emission quantity that is determined in Step S22.

A maximum value that is provided when four light quantity adjustment patches (yellow, magenta, cyan, and black) are detected by the photodetector 40*c* is Sc. For example, if an output value of the photodetector 40*c* for magenta among yellow, magenta, cyan, and black is largest, the output value of magenta is set as Sc in FIG. 16. A target line (fixed value) is expressed by St. The target line St is previously determined as a specification on the basis of the characteristics of the photodetectors, is previously stored in, for example, ROM 102, and is read and specified from ROM 102 by the CPU 101.

Here, when the light quantity setting is too large, the outputs of the photodetectors 40*c* and 40*b* are fixed to the upper limit. It is most desirable to set the outputs of the photodetectors 40*c* and 40*b* to values (to the target line shown in FIG. 16) that is not fixed to an upper limit while making the detection range of the photodetector 40*c* as large as possible.

For achieving this desirable mode, the light quantity setting ID for the image density control is calculated as follows:

$$ID=(St/Sc)*(IR-I0)+I0 \quad (2)$$

Then, the calculated light quantity setting for the image density control is stored in the non-volatile memory 109, and is updated. The light quantity setting ID that is stored in the non-volatile memory 109 is equivalent to the value that is read from the non-volatile memory 109 in Step S2 shown in FIG. 7. If the light quantity setting ID is a value that allows the light quantity to be set, the light quantity setting ID may be the light quantity value itself or a value that allows the light quantity to be indirectly set.

Figures 17A, 17B:
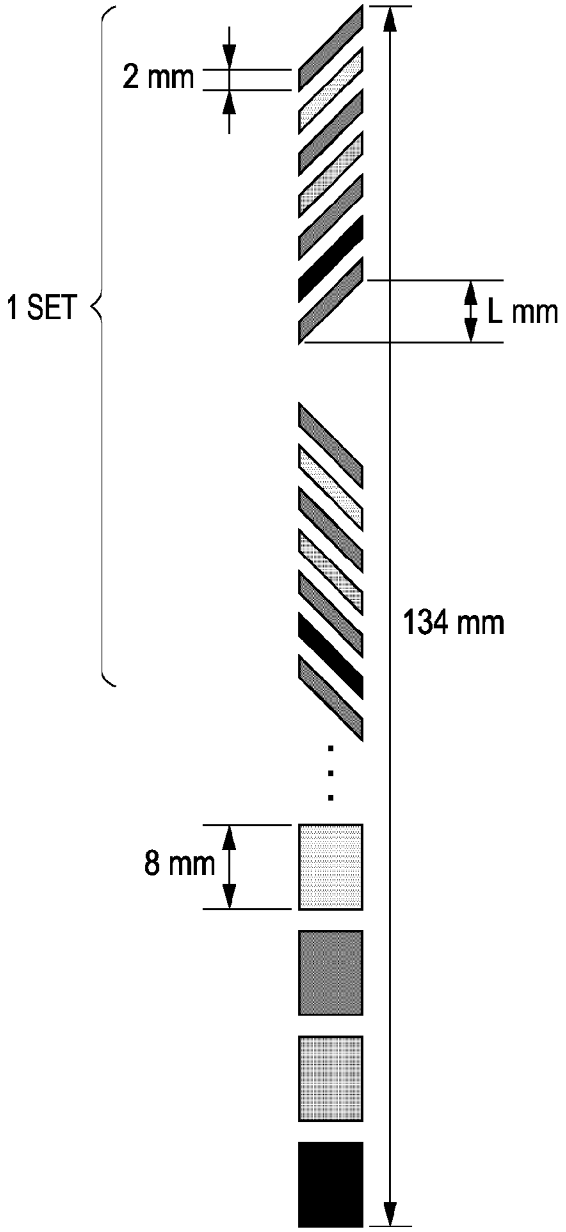
FIGS. 17A and 17B are a table and a diagram for describing advantages.

Relationship Between Type of Reflected Light and Length of Patch for Color-Misregistration Correction Control FIG. 17A shows a table for describing one advantage according to the embodiment. The vertical axis represents the type of light received by the photodetectors, and the horizontal axis represents relationships among the various operations.

FIG. 17A shows that both specular reflected light and irregularly reflected light (diffuse reflected light) are used in the image density control. As mentioned above, in general, a specular reflection output resulting from subtracting the irregular reflection component is used when detecting a density detection image. As mentioned up until now, for example, in the optical detecting sensor 40 according to the embodiment, the reflected light amount obtained at the photodetector 40*b* includes, not only the specular reflection component, but also partly includes the irregularly reflected light. This is because, by subtracting the irregular reflection component and controlling the image density on the basis of the net specular reflected light, the image density control can be performed with precision.

In the color-misregistration correction control, the type of light used for detecting a color-misregistration correction control patch varies with the state or type of image bearing member on which the patch is to be formed. First, when a low-cost image bearing member is used, irregular reflection is suitable for detecting the color-misregistration correction patch. This is based on the fact that, since a low-cost image bearing member has an extremely uneven surface compared to a high-cost image bearing member, gloss at the surface of the low-cost image bearing member is reduced, resulting in a reduction in the specular reflection component from the surface of the image bearing member. This makes it impossible to provide reflected light for ensuring precision of the color-misregistration correction control. In contrast, when the light is irregularly reflected, a spot diameter is large, so that the amount of reflected light is large. The extent of influence of the uneven surface of the image bearing member is reduced, so that the detection can be performed with higher precision. On the other hand, when a color-misregistration control patch is formed on a high-cost image bearing member, the surface of the high-cost image bearing member is less uneven than that of the low-cost image bearing member. Therefore, even if detection is performed using specular reflected light, it is less necessary to worry about the influence of the uneven surface of the image bearing member. The length of the color-misregistration correction control patch when the low-cost image bearing member is used differs from that when the high-cost image bearing member is used. Since the irregularly reflected light is suitable for use with the low-cost image bearing member, the spot diameter is large, as a result of which the length of the color-misregistration correction control patch is long. On the other hand, the specular reflected light can be used for the high-cost image bearing member. In this case, as shown in FIG. 3, compared to the case in which the irregularly reflected light is used, the spot diameter can be reduced, as a result of which the length of the color-misregistration correction control patch can be reduced.

In the embodiment, specular reflected light is used in detecting a color-misregistration correction control patch. As a result, as shown in FIG. 17B, the length of the color-misregistration correction control patch in the subscanning direction can be reduced. Therefore, many color-misregistration control patches corresponding to the number of patches that are formed in one rotation of the image bearing member can be formed, so that the precision of the color-misregistration correction control is maintained at a certain level. For adjusting the light quantity for the image density control, the light quantity adjustment patches for four colors are successively formed. Even if the lengths thereof are considered, compared to the case in which irregularly reflected light is used for the color-misregistration correction control patches, the overall length of a pattern can be reduced. For example, if the length of one rotation of the image bearing member is 600 mm, the precision of the color-misregistration correction control patches is not affected so much due to the light-quantity adjustment patches.

Although the light quantity can be adjusted using color-misregistration correction patches may be performed, in such a case, the following problems arise. In adjusting the light quantity, since a solid image is used, the detection amount of irregularly reflected light is generally larger (see FIG. 4), thereby making it necessary to perform the detection with the irregularly reflected light. This makes it necessary to detect the color-misregistration correction control patches with the irregularly reflected light. Since the spot diameter of irregularly reflected light is large, it is necessary to increase a subscanning-direction width of each color-misregistration correction control patch (for example, 8 mm, which is the same as that of each light-quantity adjustment patch shown in FIG. 17B). As a result, the number of color-misregistration correction control patches that can be formed within one rotation of the image bearing member is reduced, thereby reducing the precision of the color-misregistration correction control. Apparently, the subscanning-direction widths of some of the patches may be increased for the color-misregistration correction control. However, if the intervals between the color-misregistration correction control patches are not constant, the probability with which unevenness on the image bearing member is detected is high. Therefore, such a form is actually not realistic.

In other words, although the type of reflected light used in the embodiments is not particularly limited, the invention is particularly useful when specular reflected light is used for the color-misregistration correction control rather than irregularly reflected light.

Figure 27:
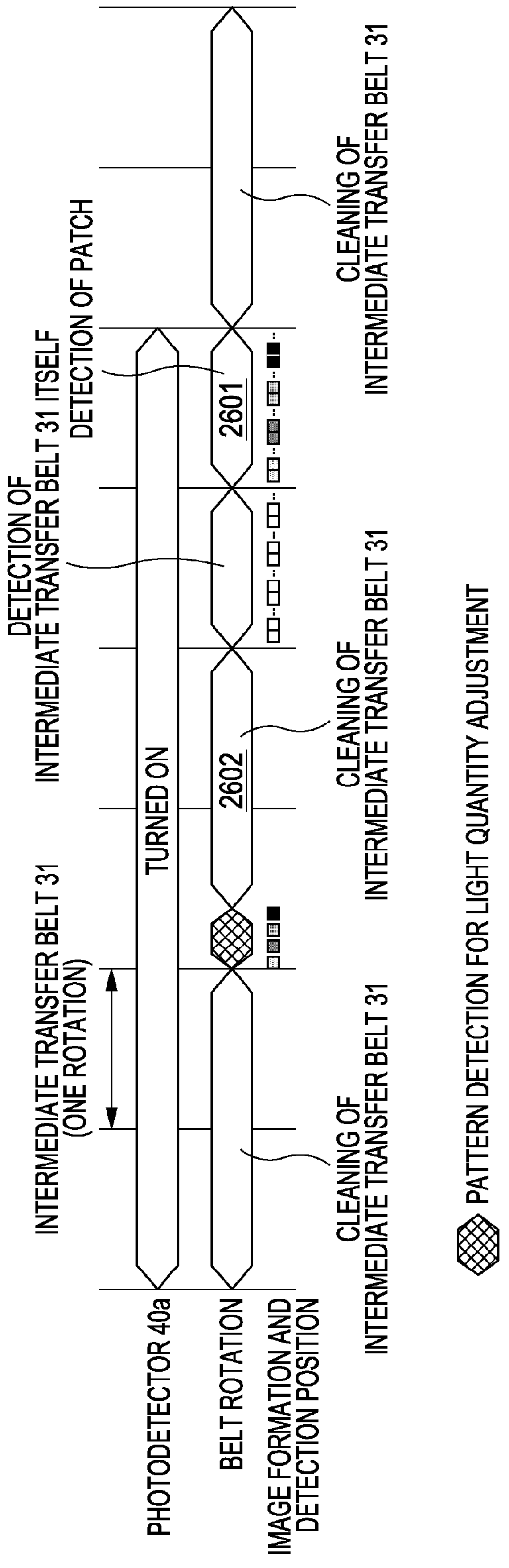
FIG. 27 shows a related example of a sequence of adjusting image density.

As mentioned above, when an attempt is made to adjust the light quantity when performing the image density control, first, it is necessary to detect the foundation of the intermediate transfer belt 31 (image bearing member) with a corrected light quantity. Therefore, it is necessary to clean the intermediate transfer belt before and after the light-quantity adjustment patches in accordance with a plurality of rotations thereof. In contrast to this related art, according to the description with reference to FIGS. 14 and 15, the light quantity is previously adjusted using density control adjustment patches, to execute the density control shown in FIG. 7. Therefore, compared to the related art, at least the cleaning of the intermediate transfer belt required in 2602 in FIG. 27 can be eliminated. This makes it possible to detect a solid patch (light-quantity adjustment image) while maintaining the precision of the image density control and quickly performing the image density control.

According to the operations indicated in FIGS. 14 and 15, light-quantity adjustment patches are formed on the intermediate transfer belt 31 within the same rotation as that in which the color-misregistration detection pattern is formed. Using the light quantity of the color-misregistration detection pattern, the light quantity is adjusted. Therefore, the total processing time for adjusting the light quantity and the color misregistration can be reduced.

From the viewpoint of reducing the image density control time, light quantity adjustment patches may be formed separately from when the color-misregistration correction control is performed. Comparing this case and the case in which the operations shown in FIGS. 14 and 15 are performed, the total time required for controlling the light quantity adjustment patches and the color misregistration in the latter case can be reduced.

When the light quantity adjustment patches are detected using a light quantity that is the same as that when detecting color misregistration, a table (conversion method) in which the light quantity adjustment patches can be set is provided. Therefore, a problem in which a certain time is required until the light-emission quantity of the light-emitting diode 40*a* is stabilized can be overcome. If, as in the condition shown in FIG. 15, the light-emission quantity of the light quantity adjustment patches is the same as that when the density is detected, it takes time for the light emission of the light-emitting element to become stabilized. As a result, the total amount of time required for controlling the color misregistration and detecting the light quantity adjustment patches becomes long, thereby increasing a downtime of a printer. On the other hand, according to the features shown in FIGS. 14 and 15, the downtime can be reduced, so that usability can also be increased.

A second exemplary embodiment will be described as follows. In the first exemplary embodiment, the light-quantity-versus-photodetector-output characteristics of a solid image and the intermediate transfer belt 31 are described when the light-quantity-versus-photodetector-output characteristics of the solid image have larger values. In contrast, in the second exemplary embodiment, a case in which the light-quantity-versus-photodetector-output characteristics of the solid image have smaller values in the intermediate transfer belt 31 is considered, to set a suitable density-control light quantity.

Preparation for Color-Misregistration Correction Control and for Adjusting Light Quantity for Image Density Control A specific example of the color-misregistration correction control will hereunder be described with reference to FIGS. 18 and 19. First, in Step S41 to Step S46, similar operations to those performed in Step S21 to Step S26 in FIG. 14 are performed. Step S47 is the same as Step S27 except that the setting of light quantity for density control is not performed.

Then, in Step S48, cleaning of an intermediate transfer belt 31 is started. This cleaning operation is indicated by reference numeral 1806 in FIG. 19. Then, while the intermediate transfer belt 31 is rotated twice, line images or light quantity adjustment patches, formed on the intermediate transfer belt 31, are removed by the action of a cleaning blade 33.

Thereafter, concurrently with the operation of Step S48, in Step S49, a light quantity setting of a light-emitting element 40*a* is changed to an image density control light quantity (corresponding to a light quantity setting ID) that is stored in a non-volatile memory 109, to turn on the light-emitting element 40*a*. The turning on of the light-emitting element 40*a* is indicated by reference numeral 1805 in FIG. 19.

In Step S50, light emission of an optical detecting sensor is stabilized.

Figure 19:
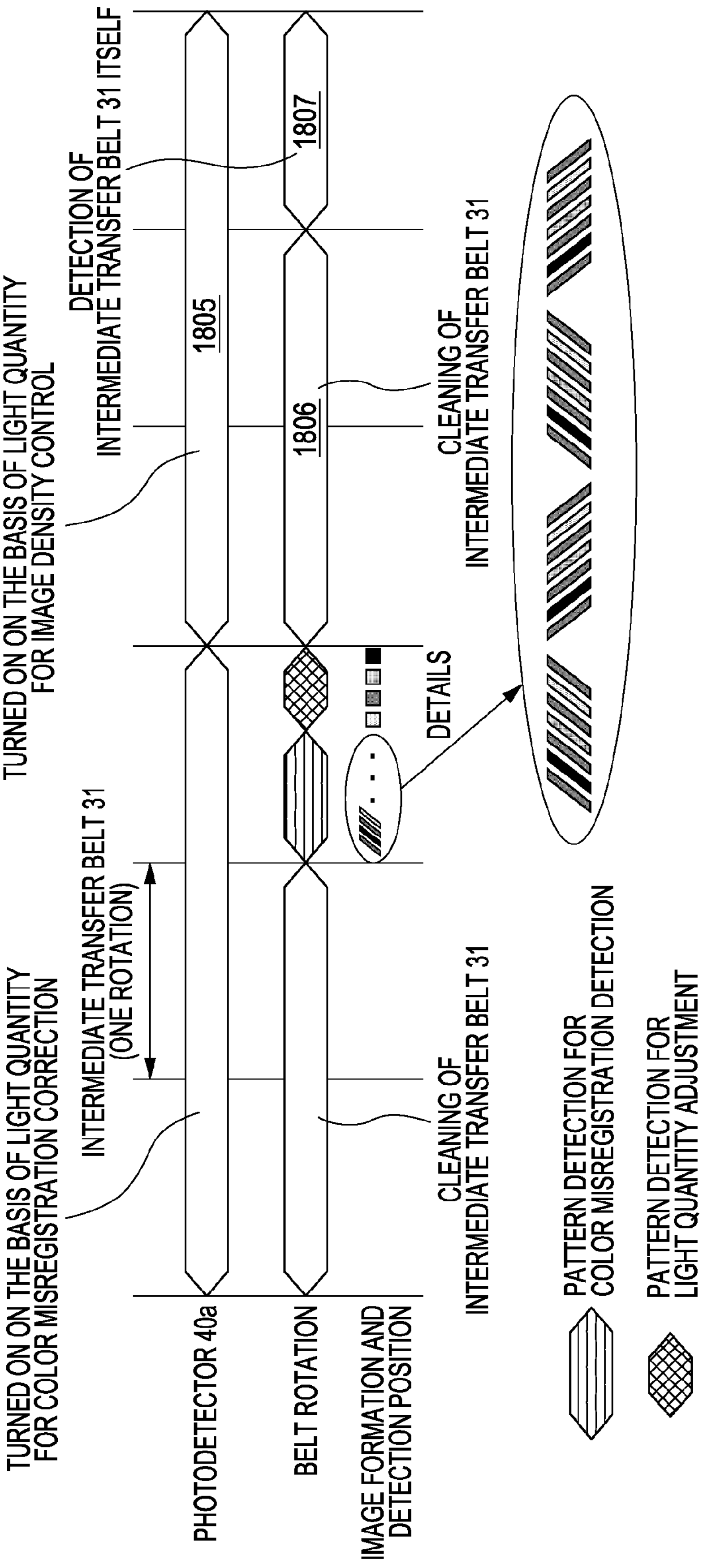
FIG. 19 illustrates an operation timing of the another example of the color-misregistration correction controlling operation and the operation for adjusting light quantity when performing image density control.
Figure 22:
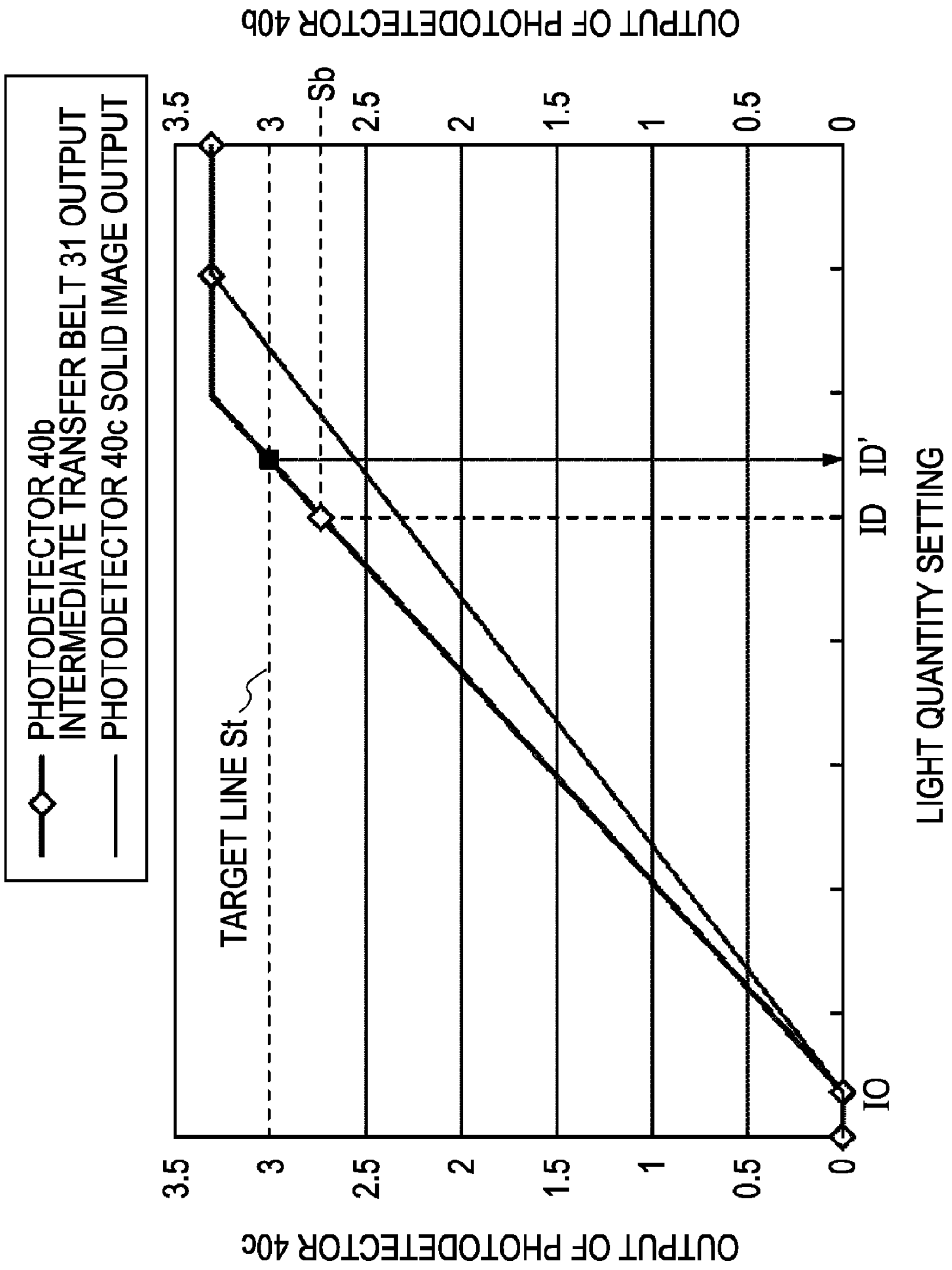
FIG. 22 is a graph showing an exemplary method of determining the light quantity in controlling image density when the reflectivity of the intermediate transfer belt is high.
Figure 23:
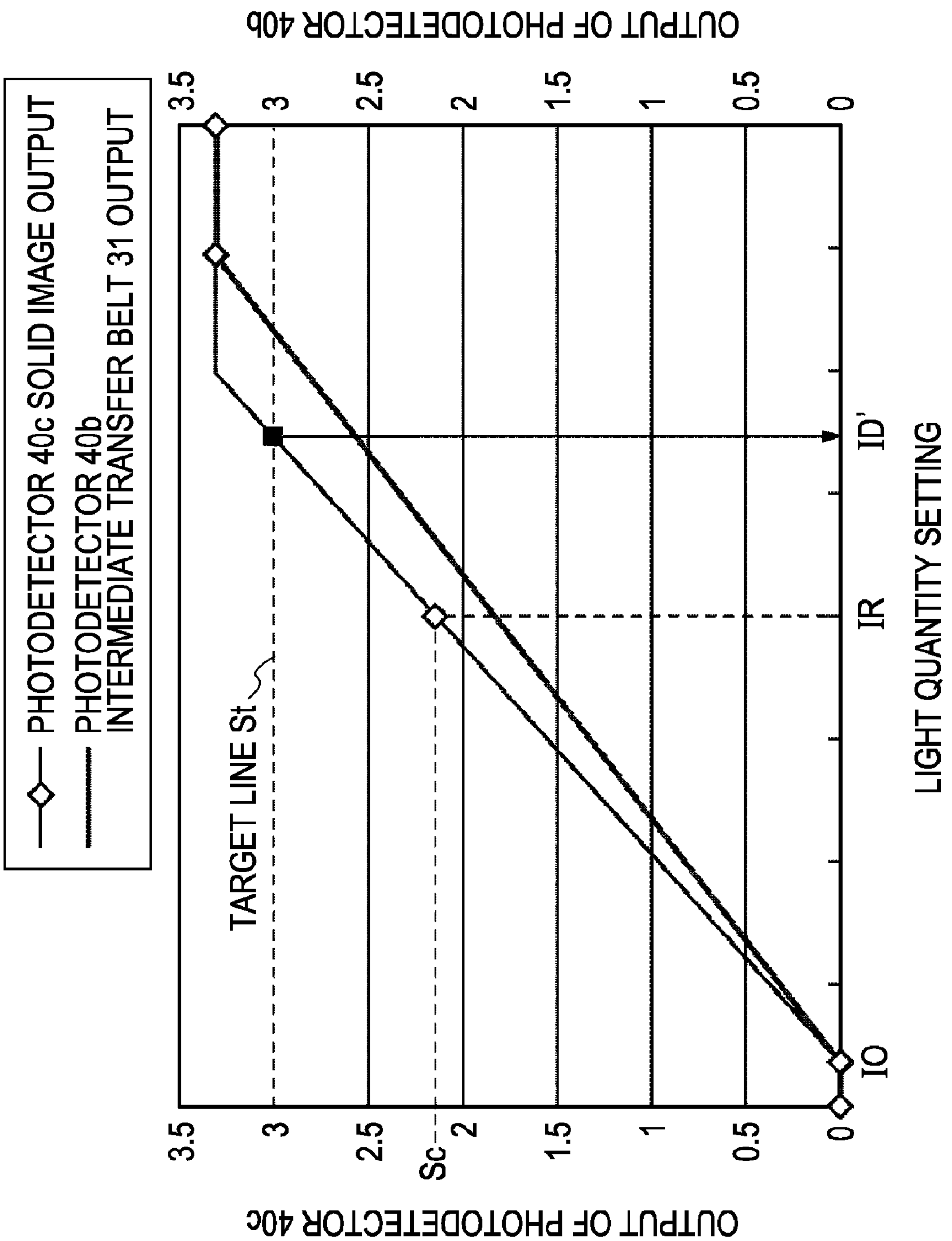
FIG. 23 is a graph showing an exemplary method of determining the light quantity in controlling the image density when the reflectivity of the intermediate transfer belt is low.

In Step S51, a reflected light signal from the intermediate transfer belt 31, itself, is obtained for one rotation of the intermediate transfer belt 31 by a photodetector 40*b* at a predetermined interval (this operation is indicated by reference numeral 1807 in FIG. 19). A foundation of the intermediate transfer belt 31, itself, is detected for clarifying the relationship between the sizes of light-quantity-versus-photodetector-output characteristics of a solid image and the intermediate transfer belt 31. This makes it possible to determine whether or not setting of light quantity (discussed below) is performed in accordance with a case 1 (FIG. 20) or a case 2 (FIG. 21). An output value of the photodetector obtained in Step S51 is used in calculating light quantity adjustment for density control as illustrated in FIGS. 22 and 23 (described later).

Figure 20:
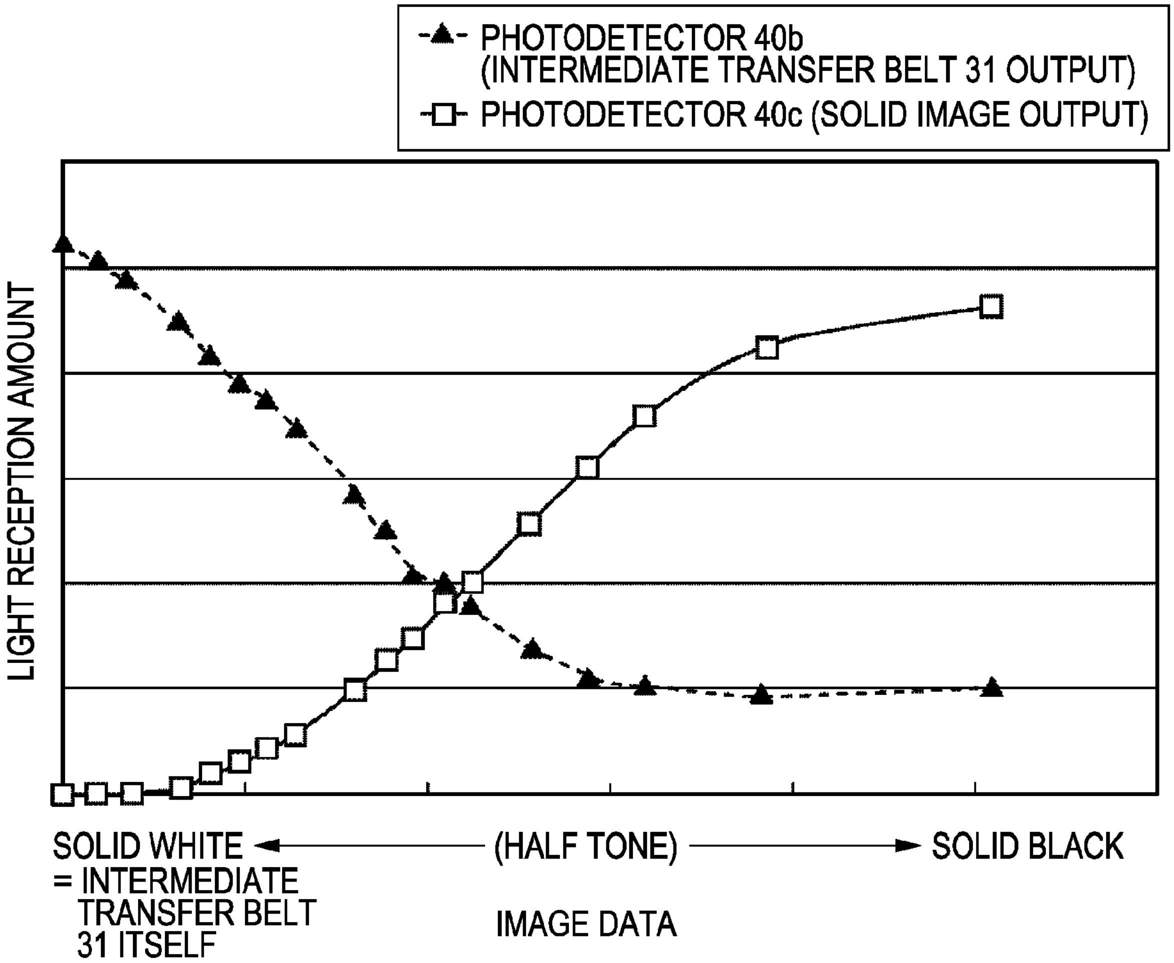
FIG. 20 is a graph showing an example of an output of the photodetector when reflectivity of an intermediate transfer belt is high.
Figure 21:
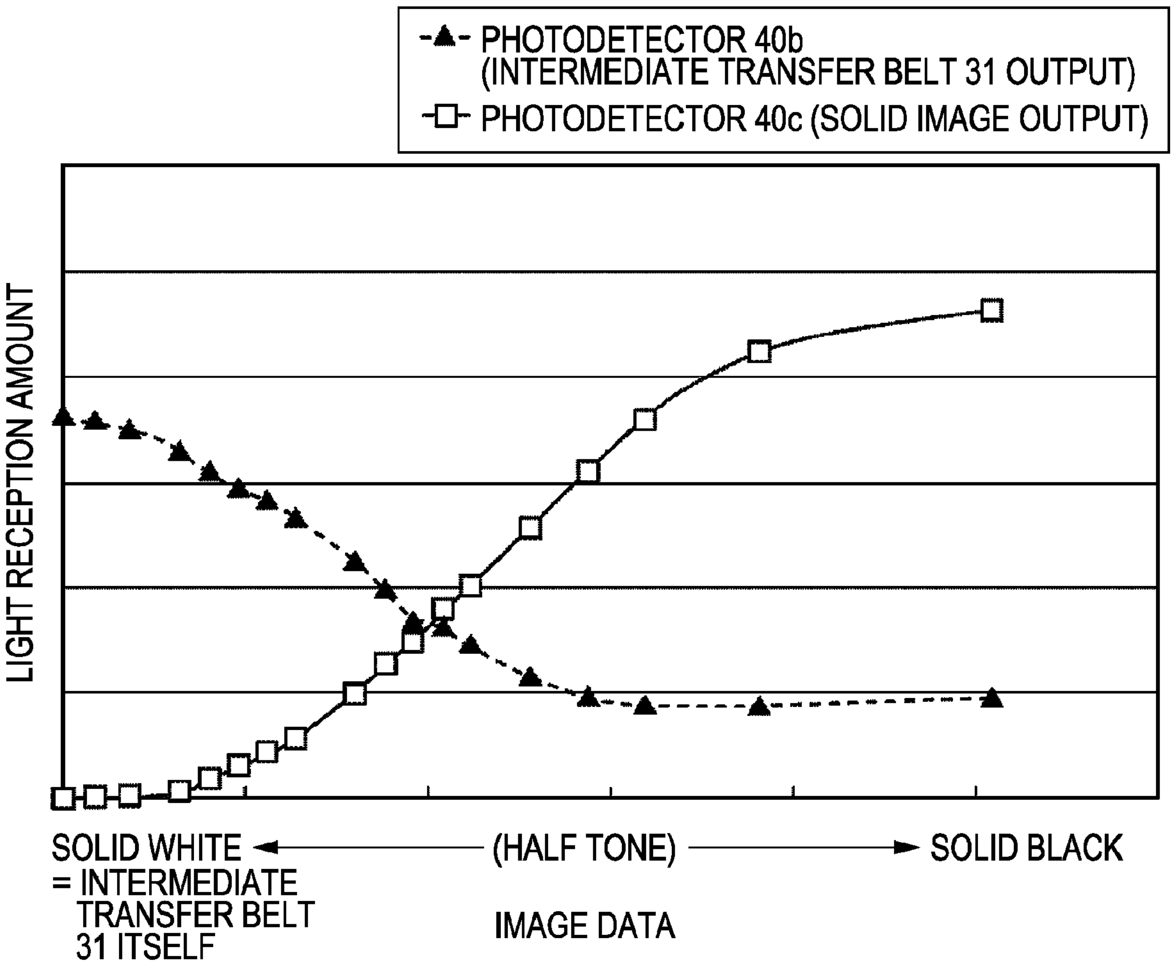
FIG. 21 is a graph showing an example of an output of the photodetector when reflectivity of the intermediate transfer belt is low.

In another application example, if the operation in Step S51 is executed so that the state of the intermediate transfer belt 31 is a border-line state where the state of the intermediate transfer belt 31 changes from that shown in FIG. 20 to that shown in FIG. 21, the operation can be more efficiently performed. More specifically, it is determined whether or not the state of the intermediate transfer belt 31 is the border-line state using as a parameter a driving amount of an image forming apparatus or a process cartridge 32. That is, for example, it is determined whether or not the number of prints has reached a predetermined number of prints, or whether or not a driving time of a printer has reached a predetermined time.

When the operation of Step S51 ends, the rotation of the intermediate transfer belt 31 is stopped in Step S52. In addition, in Step S53, the light-emitting element 40*a* of the optical detecting sensor 40 is turned off, to end the preparation for the color-misregistration correction control and for adjusting the light quantity for the image density control.

Figure 18:
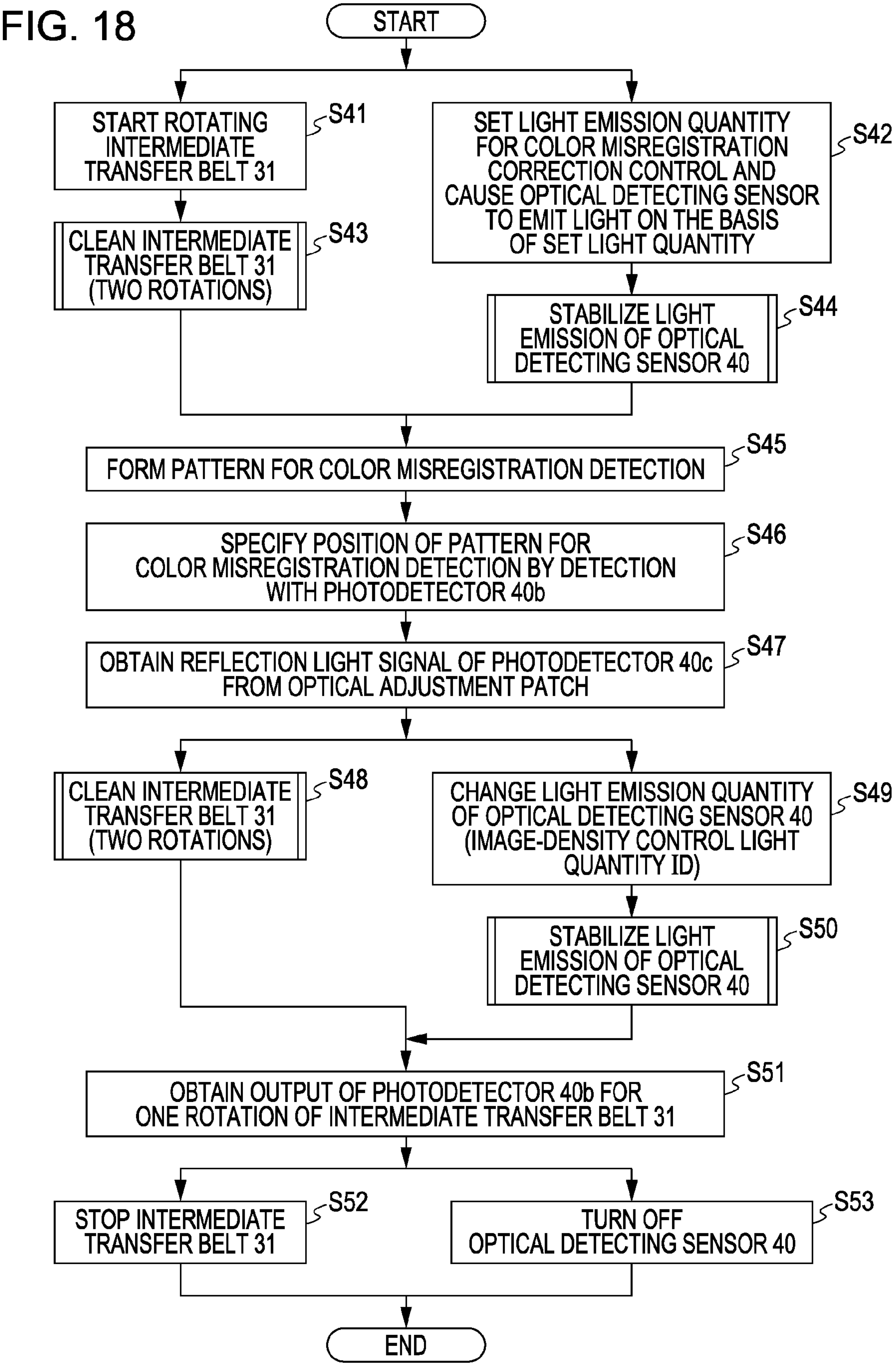
FIG. 18 is a flowchart of another example of a color-misregistration correction controlling operation and an operation for adjusting light quantity when performing image density control.

The flow chart shown in FIG. 18 does not include the step of determining the light quantity adjustment itself. As long has the determining step is performed in or following Step S51, it may be performed at any stage before executing the image density control.

Method of Determining Light Quantity for Image Density Control

An example of adjusting light quantity when controlling the density while considering the sizes of reflectivities of both the intermediate transfer belt 31 and solid image patches for light quantity adjustment will be hereunder described. More specifically, a method of adjusting the light quantity in accordance with a result of comparison between the sizes of output values of the photodetector 40*b* and a photodetector 40*c* when the light-emitting element 40*a* performs irradiation on the intermediate transfer belt 31 and the solid image patches for light quantity adjustment will be described. The output value provided when the light irradiation is performed on the intermediate transfer belt 31 is a maximum value among a plurality of detection results obtained as a result of irradiating the intermediate transfer belt 31 with a certain light quantity (ID). The output value provided when the light irradiation is performed on the solid images for the light quantity adjustment is a maximum value among densities (detection values) of the yellow, magenta, cyan, black solid images.

For example, as shown in FIG. 20, when the intermediate transfer belt 31 is substantially a new product, the reflectivity of its surface is high, and the maximum value of the output of the photodetector 40*b*, itself, for the intermediate transfer belt 31 is larger (case 1). On the other hand, as shown in FIG. 21, when the intermediate transfer belt 31 is used for a long period of time, it is possible for the reflectivity of its surface to be reduced, so that the maximum value of the output of the photodetector 40*b*, itself, for the intermediate transfer belt 31 becomes smaller (case 2). For setting the reflectivity of the surface of the intermediate transfer belt 31, itself, the reflectivity (light-reception amount) corresponding to solid white in terms of image data may be referred to. FIGS. 22 and 23 show the relationships between light quantity settings and the outputs of the photodetectors 40*b* and 40*c* in correspondence with the aforementioned cases 1 and 2. The color image forming apparatus determines whether the result obtained in Step S51 corresponds to the output characteristics of either FIG. 22 or FIG. 23, to select and execute the method of adjusting the light quantity when controlling the density in accordance with the determination.

In FIG. 22, a maximum value Sb of an output of the photodetector 40*b* for one rotation of the intermediate belt 31 is plotted in a graph by the light emission with the light quantity setting ID for the image density control. The maximum value Sb is detected from a detection object. The light quantity setting ID for the image density control corresponds to the value that is read in Step S49.

In FIG. 23, a maximum value Sc of the outputs of the photodetector 40*c* for four light quantity adjustment patches (yellow, magenta, cyan, black), detected on the basis of the light quantity setting IR for the color-misregistration correction control, is plotted in a graph The maximum value Sc is as described in the first exemplary embodiment.

It is desirable that the outputs of the photodetector 40*c* and the photodetector 40*b* be set as large as possible (target lines in FIGS. 22 and 23) without being fixed to upper limits.

(i) In the case 1, the updating of the light quantity setting ID for the image density control can be calculated as follows. A value ID' resulting from updating the light quantity setting ID for the image density control is expressed as in Formula (3):

$$ID'=(St/Sb)*(ID-I0)+I0 \quad (3)$$

(ii) In the case 2, the light quantity setting ID' for the image density control can be calculated using Formula (4). Formula (4) corresponds to Formula 2 used to update the value ID according to the first exemplary embodiment:

$$ID'=(St/Sc)*(IR-I0)+I0 \quad (4)$$

This light quantity determining method can also be described as follows. The maximum value Sc of the outputs of the photodetector 40*c* for the four light quantity adjustment patches (yellow, magenta, cyan, black), detected on the basis of the light quantity setting IR for the color-misregistration correction control, is converted into an output value Sc' (which is assumed when the maximum value is detected on the basis of the light quantity setting ID for the image density control) using the following Formula (5):

$$Sc'=Sc/(IR-I0)*(ID-I0) \quad (5)$$

When the larger value of the values Sc' and Sb is represented as Smax, the updated value ID' of the light quantity setting ID for the image density control can be calculated using Formula (6):

$$ID'=(St/Smax)*(ID-I0)+I0 \quad (6)$$

As described above, even if, when using a predetermined light quantity, the relationship between the maximum value of the outputs of the photodetector 40*c* that receives irregularly reflected light and the maximum value of the outputs of the photodetector 40*b* that receives specular reflected light varies in accordance with the condition of use of the image forming apparatus, the light quantity can be properly set. In addition, a proper light quantity setting for the image density control can be calculated with the light quantity for the color-misregistration correction control. Therefore, the detection precision of the image density control can be maintained without making long the time required for the image density control. In the second exemplary embodiment, one extra operation for one rotation of the intermediate transfer belt 31 is included. However, since the image density control can be quickly performed, an advantage that is similar to that according to the first exemplary embodiment can be provided.

A third exemplary embodiment will be described as follows. In each of the above-described embodiments, adjustments are made so that the maximum output values obtained from the photodetectors 40*b* and 40*c* are adjusted so as to reach a target line St on the basis of the light quantity setting ID for the image density control (FIG. 16) or the light quantity setting ID' for the image density control (FIGS. 22, 23). For example, as discussed in the section "Necessity of Adjusting Light Quantity for Image Density Control," according to the first exemplary embodiment, in the image density control, calculation error (quantized error) is restricted to a small value by making an output range of the photodetectors 40*b* and 40*c* as large as possible, to ensure the precision of the image density control. Within ordinary expectations, the outputs of the photodetectors 40*b* and 40*c* with respect to toner amount behave as shown in FIGS. 20 and 21. More specifically, when the toner adhesion amount increases, the output of the photodetector 40*b* that primarily receives specular reflected light is reduced because light is intercepted by toner. On the other hand, when the toner adhesion amount increases, the output of the photodetector 40*c* that receives only irregularly reflected light is increased due to an increase in light diffusion. Here, according to this principle, it can be understood that the maximum values of the outputs from the photodetectors 40*b* and 40*c* correspond to the output value of the photodetector 40*b* when there is no adhesion of toner and the output value of the photodetector 40*c* with respect to solid patches. The second exemplary embodiment is one to which the invention of the application is applied on the basis of this assumption.

However, in a further case, for example, lot variations of the optical detecting sensor may cause the photodetector 40*b* that is designed to primarily receive specular reflected light to receive a large amount of irregularly reflected light. In this case, as with the photodetector 40*c*, when the toner amount is increased, the output of the photodetector 40*c* may increase (refer to FIG. 25). According to the third embodiment, this further case is hereunder achieved so that a proper light setting ID' for the image density control can be selected. That is, three outputs, the output for the intermediate transfer member, itself, of the photodetector 40*b* that receives specular reflected light, the output for a solid image of the photodetector 40*b* that receives specular reflected light, and the output for a solid image of the photodetector 40*c* that receives only irregularly reflected light are used to set a proper light quantity for the image density control.

Figure 24:
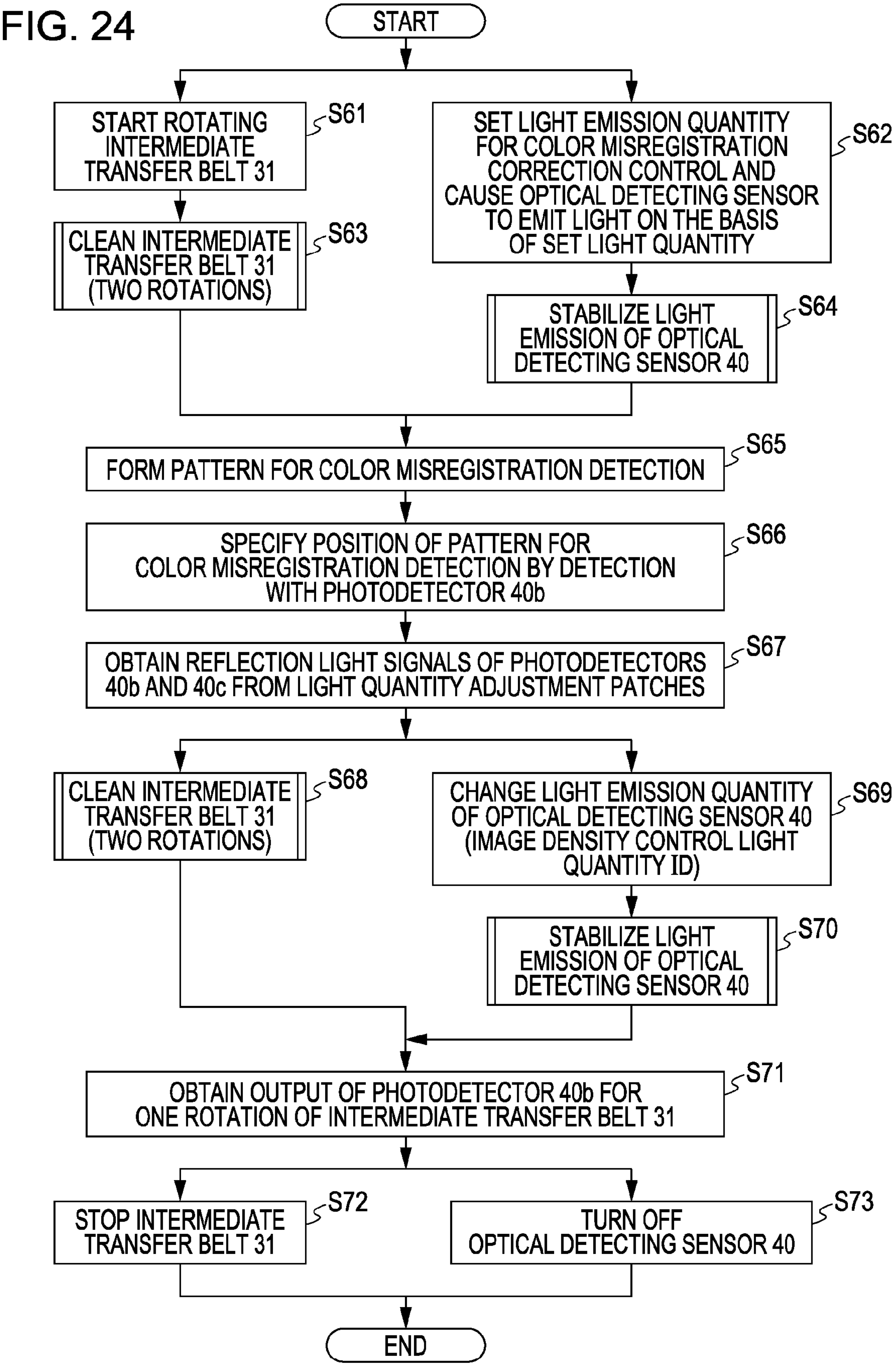
FIG. 24 is a flow chart of an example of a color-misregistration correction controlling operation and an operation for adjusting light quantity when performing image density control.

Color-Misregistration Correction Control and Light Quantity Adjustment of Image Density Control Next, a specific example of color-misregistration correction control according to the embodiment will be described with reference to FIG. 24. Steps S61 to S66 according to the embodiment are similar to Steps S41 to S46 according to the second embodiment.

According to the embodiment, thereafter, when light quantity adjustment patches are formed and outputs thereof are monitored, outputs from both the photodetectors 40*b* and 40*c* are obtained (Step S67).

The subsequent Steps S68 to S73 are similar to Steps S48 to S53 according to the second exemplary embodiment.

Method of Determining Light Quantity for Image Density Control

Figure 25:
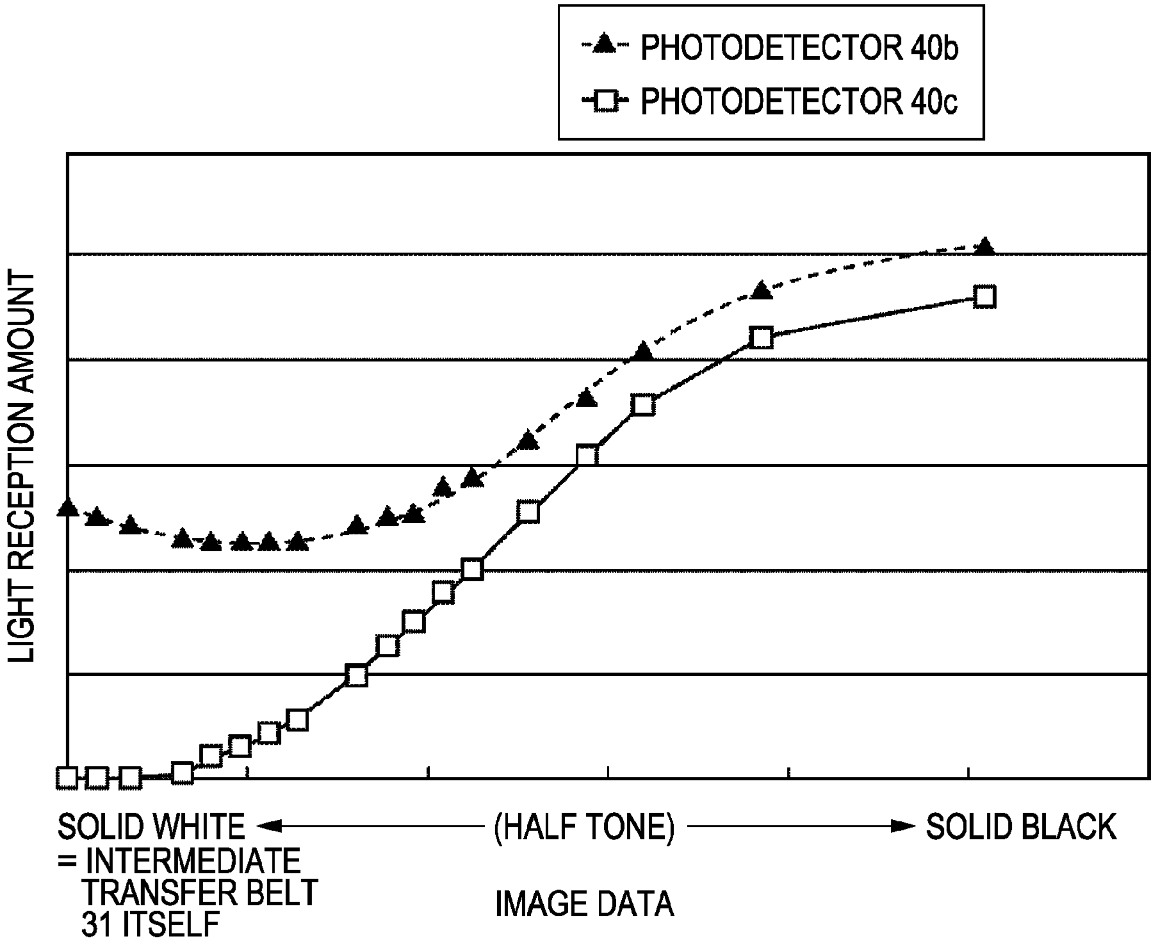
FIG. 25 is a graph of an example of a photodetector output when an output value of a solid image from a photodetector 40*b* is high.

A following case will hereunder be described. Here, as shown in FIG. 25, when the intermediate transfer belt 31 and patch images are irradiated using the light-emitting element 40*a*, a maximum output value that is obtained when the yellow (Y), magenta (M), cyan (C), and black (Bk) solid images are detected is larger than an output for the intermediate transfer belt 31 from the photodetector 40*b*. This is a case in which the photodetector 40*b* receives a large amount of irregular reflection component due to, for example, using the intermediate transfer belt 31 for a long time and lot variations of the sensor.

Figure 26:
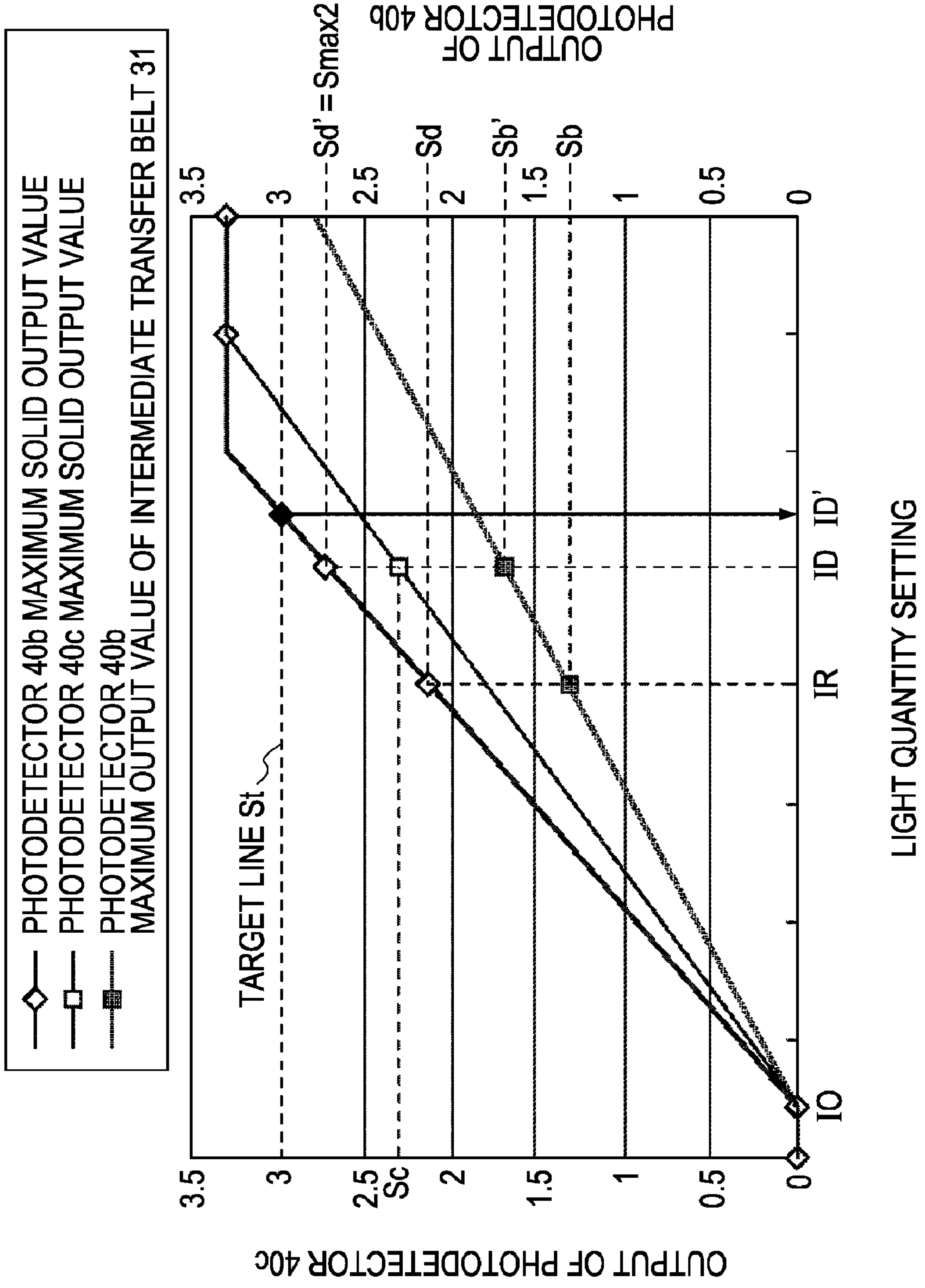
FIG. 26 is a graph showing an exemplary method of determining the light quantity in controlling the image density.

FIG. 26 shows light quantity setting, output for the intermediate transfer member 31 from the photodetector 40*b*, output of a solid image from the photodetector 40*b*, and output for a solid image from the photodetector 40*c*. When the maximum value among the outputs from the photodetector 40*b* for four light quantity adjustment patches (Y, M, C, Bk), detected on the basis of the light quantity setting IR for the color-misregistration correction, is represented by Sd, the maximum value Sd can be converted using the following Formula (7) into the output value Sd' that may be set when the light quantity setting ID for the image density control is detected:

$$Sd' = Sd/(IR - I0)*(ID - I0) \quad (7)$$

When the largest value that is obtained as a result of comparing the Sd' value, Sc' value (refer to Formula (5) according to the second exemplary embodiment) and the Sb value with each other is represented by Smax2, the value ID' resulting from updating the light quantity setting ID for the image density control can be calculated using Formula (8):

$$ID' = St/(S\max 2)*(ID - I0) + I0 \quad (8)$$

Therefore, the third exemplary embodiment considers the case in which, when the intermediate transfer belt 31 and patch images are irradiated with a predetermined light quantity using the light-emitting element 40*a*, a maximum output value among the output values of the yellow (Y), magenta (M), cyan (C), and black (Bk) solid images is larger than the output for the intermediate transfer belt 31 from the photodetector 40*b*. It becomes possible to calculate a proper light quantity setting for the image density control with the light quantity for the color-misregistration correction control. In addition, it becomes possible to maintain the detection precision for the image density control without increasing the time for the image density control. In the third exemplary embodiment, it is possible to provide the advantage of reducing the time required for the color-misregistration correction control as in the above-described exemplary embodiments.

A fourth exemplary embodiment will be described as follows. In the first to third embodiments, the density control illustrated in FIGS. 7 and 8 and the light quantity adjustment illustrated in FIGS. 15 and 19 are executed asynchronously. However, the present invention is not limited thereto.

The operation of determining the position of the positional displacement detection image (carried out on the basis of a detection result of the positional displacement detection image formed within a one-rotation length of the image bearing member), the operation of determining the light-emission quantity (carried out on the basis of a detection result of the light quantity adjustment image formed within the one-rotation length of the image bearing member), and the density detection may be continuously executed without printing of a print job between these operations.

Figure 8:
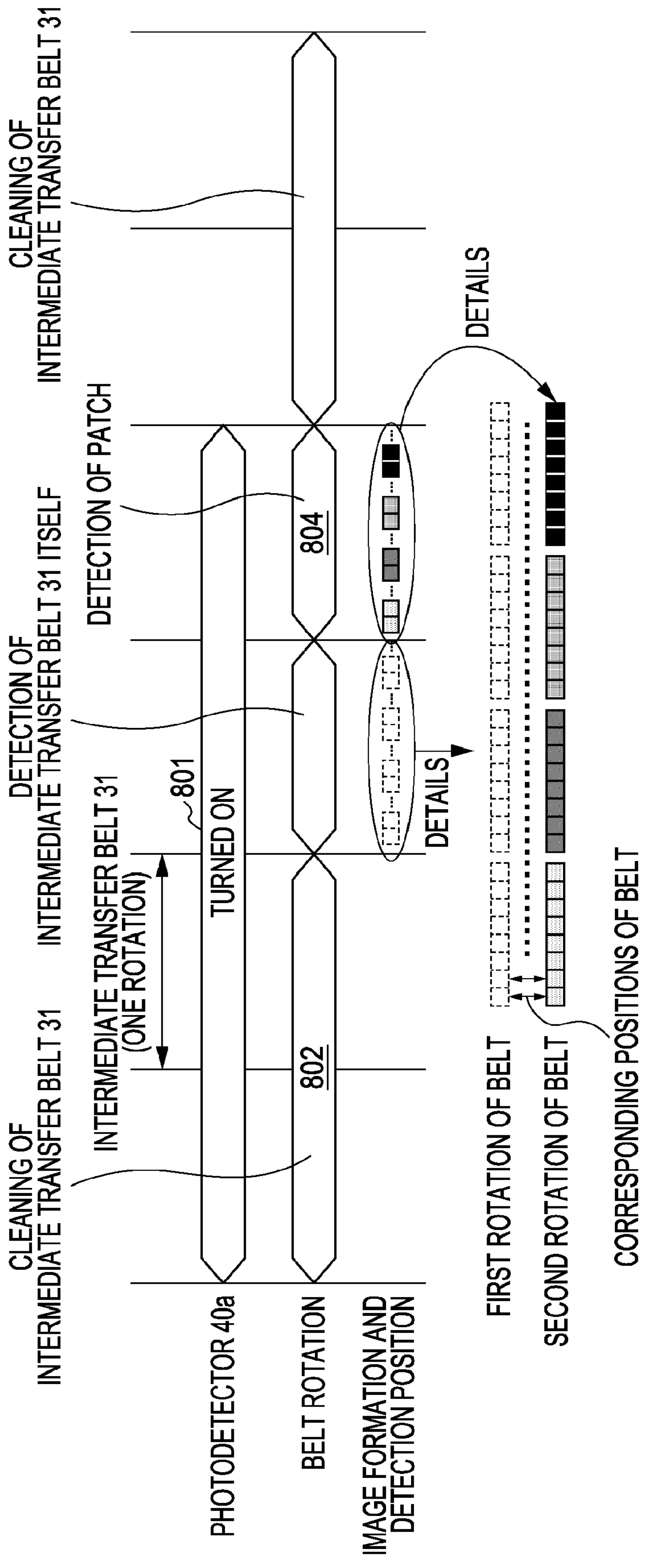
FIG. 8 illustrates an operation timing of the image density control.

For example, the operation represented by reference numeral 1505 in FIG. 15 may be made to correspond to the operation represented by reference numeral 802 in FIG. 8, and the operations shown in FIG. 8 may be continuously performed after the operations shown in FIG. 15. That is, the operation of determining the position of the positional displacement detection image (carried out on the basis of the detection result of the positional displacement detection image formed within the one-rotation length of the image bearing member), the operation of determining the light-emission quantity (carried out on the basis of the detection result of the light quantity adjustment image formed within the one-rotation length of the image bearing member), and the density detection may be continuously executed without printing of a print job between these operations.

In another example, the operations represented by reference numerals 1805, 1806, and 1807 in FIG. 19 may be made to correspond to the operations represented by reference numerals 801 and 802 in FIG. 8, and the operations shown in FIG. 8 may be continuously executed after the operations shown in FIG. 19. At this time, in the operation represented by reference numeral 801 in FIG. 8, the light-emitting element 40*a* is turned on until the end of the operation represented by reference numeral 804 on the basis of the density control light quantity, as in the operation represented by reference numeral 1805 in FIG. 19. Even in this example, similar operations to those in the first to fourth embodiments can be achieved.

In the above-described image forming apparatus, although the cleaning blade 33 is used as the cleaning unit of the intermediate transfer belt 31, the cleaning unit is not limited thereto. For example, a cleaning unit may be a type in which a brush or a roller contacts the intermediate transfer belt 31 to (temporarily) mechanically or electrostatically collect toner. In addition, a cleaning unit may be a type in which a charger, such as a roller, a corona member, or a brush, is used to apply electrical charge to toner adhered to the intermediate transfer belt 31, so that the toner is electrostatically returned to the photosensitive drums 2.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-309703 filed Nov. 30, 2007, which is hereby incorporated by reference herein in its entirety.

What is claimed is:

1. A color image forming apparatus comprising:

an image forming unit configured to form a toner image;

an image bearing member configured to bear the toner image of a plurality of colors;

a light-emitting element configured to perform irradiation using light;

a photodetector configured to receive reflected light;

a position detecting unit configured to determine a position of a position detection toner image on the basis of a detection result of the photodetector according to emission of the light onto the position detection toner image by the light-emitting element, the position detection toner image being of a plurality of colors and being formed on the image bearing member;

a density detecting unit configured to detect density on the basis of a detection result of the photodetector according to emission of the light by the light-emitting element onto a density detection toner image formed on the image bearing member; and a light quantity adjusting unit configured to determine a light-emission quantity that is set when detecting the density, on the basis of a detection result of the photodetector according to emission of the light by the light-emitting element onto a light quantity adjustment toner image formed on the image bearing member, wherein the image forming unit forms the position detection toner image and the light quantity adjustment toner image within a one-rotation length of the image bearing member, wherein the position detecting unit determines positional displacement between the colors on the basis of a detection result of the position detection toner image formed within the one-rotation length, and wherein the light quantity adjusting unit determines the light-emission quantity that is set when detecting the density, on the basis of a detection result of the light quantity adjustment toner image formed within the one-rotation length, the detection result of the light quantity adjustment toner image formed within the one-rotation length being provided when the light-emitting element emits the light with a light-emission quantity that is set when the light emitting element emits the light onto the position detection toner image.

2. The color image forming apparatus according to claim 1, further comprising a cleaner configured to remove a toner image of the position detection toner image and the light quantity adjustment toner image from the image bearing member, and to remove the toner images when the image bearing member has further rotated once.

3. The color image forming apparatus according to claim 1, wherein the detection result of the photodetector provided when the light-emitting element emits the light on the position detection toner image is based upon reception of specular reflected light.

4. The color image forming apparatus according to claim 1, further comprising a storage control unit configured to cause the quantity of the emission of the light onto the density detection toner image to be stored in a nonvolatile storage unit, the quantity of the emission of the light onto the density detection toner image being determined by the light quantity adjusting unit, wherein the density detecting unit detects the density on the basis of the light emission quantity stored in the nonvolatile storage unit.

5. The color image forming apparatus according to claim 4, wherein, using the light-emission quantity stored in the nonvolatile storage unit, the density detecting unit obtains a detection result that is provided when the toner image is not formed on the image bearing member.

6. The color image forming apparatus according to claim 1, further comprising a converting unit configured to determine the quantity of the emission of the light onto the density detection toner image on the basis of a detection result obtained by converting the detection result of the light quantity adjustment toner image into one that is provided when the quantity of the emission of the light onto the density detection toner image is used.

7. The color image forming apparatus according to claim 1, further comprising a comparing unit configured to compare a size of a detection result obtained when the light-emitting element emits the light onto the image bearing member and a size of the detection result obtained when the light-emitting element emits the light onto the light quantity adjustment toner image, wherein the light quantity adjusting unit determines the quantity of the emission of the light onto the density detection toner image on the basis of a determination by the comparing unit as to which is larger between the size of the detection result obtained when the light-emitting element emits the light onto the image bearing member and the size of the detection result obtained when the light-emitting element emits the light onto the light quantity adjustment toner image.

8. The color image forming apparatus according to claim 7, wherein the comparing unit compares a size of a detection result of specular reflected light provided when the light is emitted onto the image bearing member, a detection result of irregularly reflected light provided when the light is emitted onto the light quantity adjustment toner image, and a detection result of specular reflected light provided when the light is emitted onto the light quantity adjustment toner image.

9. The color image forming apparatus according to claim 1, wherein an operation of determining the position of the position detection toner image, an operation of determining the light-emission quantity, and the density detection are continuously executed without printing of a print job between these operations, the operation of determining the position of the position detection toner image being carried out on the basis of the detection result of the position detection toner image formed within the one-rotation length of the image bearing member, the operation of determining the light-emission quantity being carried out on the basis of the detection result of the light quantity adjustment tone image formed within the one-rotation length of the image bearing member.

10. A method of controlling a color image forming apparatus comprising an image forming unit configured to form a toner image; an image bearing member configured to bear the toner image of a plurality of colors; a light-emitting element configured to perform irradiation using light; a photodetector configured to receive reflected light; a position detecting unit configured to determine a position of a position detection toner image on the basis of a detection result of the photodetector according to emission of the light onto the position detection toner image by the light-emitting element, the position detection toner image being of a plurality of colors and being formed on the image bearing member; a density detecting unit configured to detect density on the basis of a detection result of the photodetector according to emission of the light by the light-emitting element onto a density detection toner image formed on the image bearing member; and a light quantity adjusting unit configured to determine a light-emission quantity that is set when detecting the density, on the basis of a detection result of the photodetector according to emission of the light by the light-emitting element onto a light quantity adjustment toner image formed on the image bearing member, the method comprising:

forming with the image forming unit the position detection toner image and the light quantity adjustment toner image within a one-rotation length of the image bearing member, determining with the position detecting unit positional displacement between the colors on the basis of a detection result of the position detection toner image formed within the one-rotation length, and determining with the light quantity adjusting unit the light-emission quantity that is set when detecting the density, on the basis of a detection result of the light quantity adjustment toner image formed within the one-rotation length, the detection result of the light quantity adjustment toner image formed within the one-rotation length being provided when the light-emitting element emits the light with a light-emission quantity that is set when the light emitting element emits the light onto the position detection toner image.

* * * * *